Figure 1:
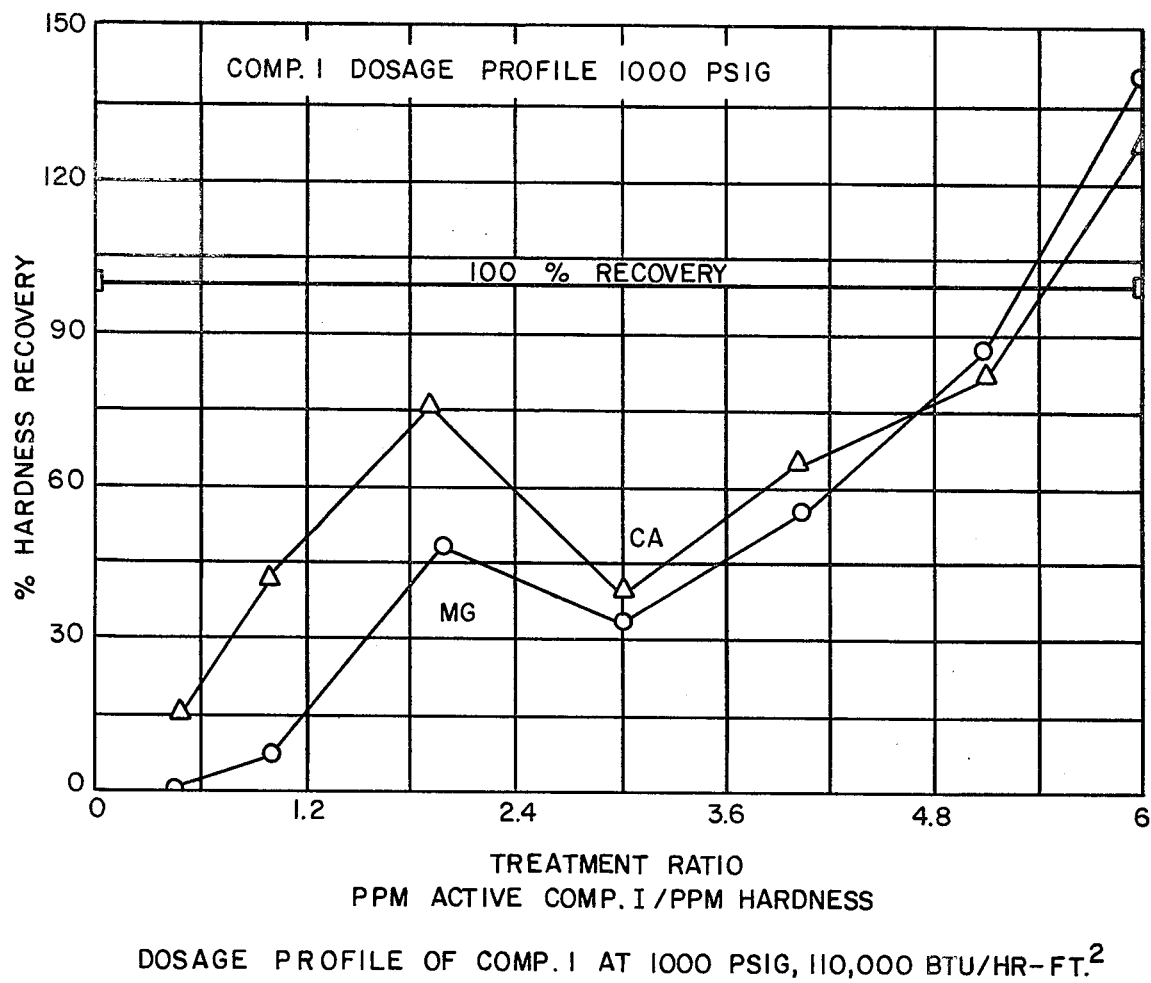

United States Patent [19]

Lorenc et al.

[11] Patent Number: 4,457,847

[45] Date of Patent: Jul. 3, 1984

[54] CARBOXYLATE POLYMERS FOR INTERNAL SCALE CONTROL AGENTS IN BOILER SYSTEMS

[75] Inventors: Walter F. Lorenc, Harvey, John G. Kelly, Woodridge, both of Ill.; Fredrick S. Mandel, Baton Rouge, La.

[73] Assignee: Nalco Chemical Company, Oak Brook, Ill.

[21] Appl. No.: 382,567

[22] Filed: May 28, 1982

Related U.S. Application Data

[63] Continuation-in-part of Ser. No. 318,665, Nov. 5, 1981, abandoned.

[51] Int. Cl.$^3$ .............................................. C02F 5/10
[52] U.S. Cl. ................................ 210/698; 134/22.19; 210/701; 252/180; 252/82
[58] Field of Search ................ 210/698, 701; 252/180, 252/181, 82; 134/2, 22.19

[56] References Cited

U.S. PATENT DOCUMENTS

| | | | |
|---|---|---|---|
| 2,327,302 | 8/1943 | Dittmar | 252/132 |
| 2,783,200 | 2/1957 | Crum et al. | 210/701 |
| 2,980,610 | 4/1961 | Ruehrwein | 210/701 |
| 3,285,886 | 11/1966 | Gunderson et al. | 210/701 |
| 3,293,152 | 12/1966 | Herbert et al. | 203/7 |
| 3,296,027 | 1/1967 | Jacklin | 134/3 |
| 3,324,063 | 6/1967 | Teot | 260/29.6 |
| 3,331,773 | 7/1967 | Gunderson | 210/698 |
| 3,463,730 | 8/1969 | Booth et al. | 210/701 |
| 3,492,240 | 1/1970 | Hettinger | 210/701 |
| 3,505,238 | 4/1970 | Liddell | 252/180 |
| 3,514,376 | 5/1970 | Salutsky | 203/7 |
| 3,549,538 | 12/1970 | Jacklin | 252/82 |
| 3,549,548 | 12/1970 | Newman | 252/181 |
| 3,578,589 | 5/1971 | Hwa et al. | 210/701 |
| 3,617,577 | 11/1971 | King | 210/698 |
| 3,623,991 | 11/1971 | Sabatelli et al. | 252/180 |
| 3,658,710 | 4/1972 | Puckorios et al. | 252/180 |
| 3,663,448 | 5/1972 | Ralston | 252/180 |
| 3,666,664 | 5/1972 | Lorenc et al. | 252/180 |
| 3,682,224 | 8/1972 | Bleyle | 252/180 |
| 3,699,048 | 10/1972 | Krueger et al. | 252/180 |
| 3,709,815 | 1/1973 | Boothe et al. | 210/701 |
| 3,709,816 | 1/1973 | Walker et al. | 210/701 |
| 3,752,761 | 8/1973 | Boothe et al. | 210/701 |

(List continued on next page.)

FOREIGN PATENT DOCUMENTS

1134786 8/1962 Fed. Rep. of Germany .
724683 2/1955 United Kingdom .
931609 7/1963 United Kingdom .

OTHER PUBLICATIONS

The Investigation of Scaling & Corrosion Mechanisms Using Process Simulation, 41st Annual Meeting Intl. Water Conference, 1980, by J. A. Kelly, P. T. Colombo, G. W. Flasch of Nalco Chemical Co.

Article in "Corrosion/1979", by Cuisia, et al.

Article written by A. E. Stafford, which appeared in Technical Journal BR. Polym. Jr., 1972, 4, 231–237.

Article from Jo. Amer. Chem. Soc., vol. 79, pp. 4898–4900, Authors, Williams, Forrest V. and Ruehrwein, Robert A.

Thurston, "Experimental Plant for Studying Methods of Controlling Scale Formation in Boilers", *J. Chem. & Ind.*, Jul. 10, 1965, pp. 1238–1243.

Zeleny et al., "The Role of Organic Additives in Preventing Scale Formation on Heating Surfaces," *Combustion*, Feb. 1963, pp. 47–49.

(List continued on next page.)

*Primary Examiner*—Peter A. Hruskoci
*Attorney, Agent, or Firm*—John G. Premo; Robert A. Miller; Donald G. Epple

[57] ABSTRACT

A method of treating hardness present in boiler waters which are in contact with heat transfer surfaces to prevent and remove scale caused by such hardness which comprises treating such waters with a water-soluble anionic vinyl polymer containing at least 30% by weight of carboxylate functionality with said polymer having a molecular weight within the range of 500–50,000 and with the amount of such polymer being within the range of 1–30 ppm per ppm hardness present in such waters.

In a preferred embodiment, the boiler waters are simultaneously treated with the water-soluble anionic vinyl polymers containing carboxylate functionality and another water-soluble anionic vinyl polymer which has dispersing properties.

14 Claims, 6 Drawing Figures

U.S. PATENT DOCUMENTS

| | | | |
|---|---|---|---|
| 3,755,264 | 8/1973 | Testa | 525/327.8 |
| 3,756,257 | 9/1973 | Rice et al. | 252/181 |
| 3,766,077 | 10/1973 | Hwa et al. | 252/181 |
| 3,790,610 | 2/1974 | Lum et al. | 260/429 J |
| 3,806,367 | 4/1974 | Lange et al. | 134/3 |
| 3,810,834 | 5/1974 | Jones et al. | 210/698 |
| 3,836,200 | 9/1974 | Booth | 210/701 |
| 3,839,215 | 10/1974 | Molders | 252/181 |
| 3,856,755 | 12/1974 | Vogt et al. | 525/327.7 |
| 3,879,288 | 4/1975 | Siegele | 210/701 |
| 4,001,134 | 1/1977 | Markofsky et al. | 252/180 |
| 4,029,577 | 6/1977 | Godlewski et al. | 252/180 |
| 4,048,066 | 9/1977 | Cuisia et al. | 210/701 |
| 4,072,607 | 2/1978 | Schiller et al. | 210/701 |
| 4,085,045 | 4/1978 | Song et al. | 210/701 |
| 4,118,318 | 10/1978 | Welder et al. | 252/175 |
| 4,147,627 | 4/1979 | Goodman | 203/7 |
| 4,163,733 | 8/1979 | Buckman et al. | 252/180 |
| 4,171,988 | 10/1979 | Phillips et al. | 252/180 |
| 4,175,100 | 11/1979 | Schiller et al. | 525/327 |
| 4,209,398 | 6/1980 | Ii et al. | 210/699 |
| 4,271,058 | 6/1981 | Trabitzsch | 523/122 |
| 4,288,327 | 4/1981 | Godlewski et al. | 210/698 |
| 4,335,220 | 6/1982 | Coney | 523/414 |

OTHER PUBLICATIONS

Denman et al., "Boiler Scale Control with Polyacrylates and Methacrylates," Proc. 28th Int. Water Conf., 1967, pp. 85–93.

Woodberry, "A New Anionic Polyacrylamide Flocculant", *Toppi*, Sep. 1961, pp. 156A–160A.

Swanson, "Advances in Boiler Water Treatment", *Ind. Water Eng.*, vol. 4, #12, Dec. 1967, pp. 22–25.

Edwards, "Role of Polymeric Flocculants in Sediment Removal in Condenser Cooling Water Systems," *J. Applied Chem.*, May 1969, pp. 141–146.

Sherry et al., "Current Trends in Corr. Cont. at W. Thurrock Power Station," *Chem. & Ind.*, Jan. 1964, pp. 102–106.

Sweett et al., "Scale Control by Polyacrylates," *Desalination*, Aug. 1970, pp. 167–175.

Denman et al., "Boiler Scale Control in the Carbonate Cycle with Synthetic Polymer," Proc. Int. Water Conf., 1968, pp. 119–123.

DOSAGE PROFILE OF COMP. I AT 1000 PSIG, 110,000 BTU/HR-FT.$^2$

FIG. I

DOSAGE PROFILE OF COMP. V AT 600 PSIG, 110,000 BTU/HR-FT.$^2$

DOSAGE PROFILE OF COMP. IV AT 600 PSIG, 110,000 BTU/HR-FT²

HARDNESS RECOVERIES OBTAINED BY COMP. I
TREATMENT ON EXPERIMENTAL BOILER

CARBOXYLATE POLYMERS FOR INTERNAL SCALE CONTROL AGENTS IN BOILER SYSTEMS

This is a continuation in part of our application, Ser. No. 318,665, filed Nov. 5, 1981, now abandoned.

INTRODUCTION

One of the biggest challenges in boiler water treatment lies in the development of simple, easily monitored, and easily controlled programs. Ideally would be one product which can prevent scale, provide heat transfer surface protection, and protect condensate systems. However, the state-of-the-art practices have not been able to meet this challenge. Chelant programs, for example, are capable of eliminating hardness deposits. They are also known, however, to cause corrosion under certain conditions. While the chelants are capable of solubilizing hardness metal ions, their strong affinity toward iron ions may actually be the corrosion mechanism. Excessive residual chelants may not only prevent the formation of magnetite but also strip the boiler of its protective magnetite films.

The purpose of this invention is to:
(1) develop programs which provide exceptional scale prevention without the corrosion potential;
(2) develop programs which provide similar scale prevention capabilities as chelants without the corrosion potential associated with chelant application.

These purposes are accomplished utilizing certain water-soluble anionic vinyl polymers in a particular dosage range either alone or in conjunction with certain low molecular weight water-soluble polymeric dispersents including sulphonate-containing, hardness-dispersing polymers.

THE INVENTION

The invention provides a method of treating hardness present in boiler waters and scale formed on heat transfer surfaces in contact with such waters to prevent and remove scale caused by such hardness which comprises treating such waters with a water-soluble anionic vinyl polymer containing at least 30% and, preferably, 70%–100% by weight of carboxylate functionality with said polymer having a molecular weight[1] within the range of 500–50,000 and with the amount of such polymer being sufficient to provide between 1–30 ppm per ppm of hardness present in the boiler waters. By the term, "hardness," we mean to include soluble and insoluble compounds of calcium, magnesium, iron, copper, aluminum, and the like.

[1]Molecular weight is the average molecular weight.

In addition to the above characteristics, the water-soluble anionic vinyl polymer must also interact with hardness ions to sequester them. The sequestration must be of such magnitude as to yield a chelation value of at least 200 as measured by specific ion electrodes.

In a preferred embodiment of the invention, the molecular weight range of the carboxylate polymers is within the range of 1,000–30,000.

In another preferred embodiment, there is utilized in combination with the anionic water-soluble vinyl polymers another water-soluble polymer having dispersant properties such as a sulphonate-containing polymer which is capable of acting as a dispersant for any excess hardness not acted upon by the sequestrant anionic water-soluble vinyl polymer.

The Water-Soluble Sequestrant Anionic Vinyl Polymers

These polymers, as indicated, have molecular weights ranging between 500–50,000, with a preferred molecular weight range being within the range of 1,000–30,000.

The polymer may be homopolymers or copolymers of vinyl carboxylate-containing monomers. "Carboxylate-containing monomers" means that the carboxylic acid groups are either in the form of the free acid or of a water-soluble salt thereof such as alkali metal, ammonia or amine. In the case of acrylic acid polymers, it would include the amide.

Thus, the homopolymers of acrylic acid, methacrylic acid, maleic acid, fumaric acid, itaconic acid, and the like may be used. Polyacrylamide, when added to the boiler water, undergoes hydrolysis to convert portions or all of the amide groups to carboxylate groups, and as such, is also included.

In addition to using these homopolymers, water-soluble copolymeric forms may also be employed. When the copolymers are used, the amount of carboxylate should be at least 30% by monomer weight ratio of the copolymers.

A preferred group of carboxylate polymers are those derived by the hydrolysis of the corresponding polyacrylamides. These materials, after either caustic or acid hydrolysis, will contain between about 10–30% by weight of amide groups. A most preferred group of carboxylate polymers are those obtained by polymerizing acrylic acid with acrylamide at a 3:1 monomer weight ratio.

As indicated, the amount of polymers used to treat the hardness contained in the boiler waters should be between 1–30 ppm per ppm of hardness.

It has been found that the preferred water-soluble anionic vinyl polymers must exhibit a chelation value in excess of 200, and preferably in excess of 300. When applied to the invention, chelation value means the average chelation value from both calcium and magnesium determinations.

Chelation Value

Chelation value is defined as the milligrams of calcium or magnesium expressed in terms of calcium carbonate complexed by one gram of active sequestrant. In this work, it is measured by specific ion electrode techniques. A known increment of sequestrant is added to a system containing a known amount of free (uncomplexed) calcium or magnesium. The decrease in calcium/magnesium activity (concentration) is then a direct measure of complexed species. This amount is then converted (ratioed) to yield the chelation value.

The effective mole ratio can also be computed using this information. By dividing the chelation value into 100,000 an equivalent weight for the sequestrant is determined. If the molecular weight is known, then the mole ratio is found by dividing the molecular weight by the equivalent weight. For EDTA and NTA, the value should approximate unity. For polymers, this number varies with the molecular weight and is generally greater than unity.

The Polymeric Dispersants

In a preferred mode of the invention, the carboxylate polymers described above are used in conjunction with a water-soluble polymer which is capable of dispersing hardness.

The polymeric dispersants used in this preferred mode of the invention are anionic water-soluble vinyl polymers. To be operative, they must be capable of dispersing suspended matter that normally occurs in boiler waters. They may be further characterized as containing either carboxylate functionality or sulphonate functionaltiy. Additionally, they may be characterized as having a molecular weight of at least 500 to about 50,000.

The water-soluble dispersing polymers useful in this invention may be chosen from the carboxylate containing water-soluble vinyl polymers such as, vinyl sulphonate-acrylic acid copolymers, vinyl sulfonate-methacrylic acid copolymers, sulfonated styrene-maleic anhydride copolymers, and acrylamide/acrylate copolymers.

The preferred water soluble dispersing polymer is a vinyl sulphonate copolymer synthesized from vinyl sulphonate and acrylic acid. This dispersant molecule generally contains from 5-25 mole percent of the vinyl sulphonate or its alkali metal (preferably Na) salts and from 95-75 mole percent of acrylic acid and its water-soluble alkali metal or ammonium salts. Preferably, the acrylic acid-vinyl sulphonate copolymers contain 10-20 mole percent of the vinyl sulphonate and from 90—80 mole percent of acrylic acid. The molecular weights of these preferred dispersant polymers range from as low as 500 to as high as 50,000. Molecular weight ranges of from 750-50,000 are preferred with a molecular weight range of approximately 900-15,000 being especially preferred. Ideally, the molecular weight will range from 1,000-6,000. It is surprising to find that these dispersant molecules may or may not be chelant or sequestrant molecules if treatment levels are drastically increased.

Another class of polymeric dispersants are the low molecular weight polyacrylic acids and their water-soluble salts. These materials have a molecular weight range of 1,000-5,000. The ratios in which these materials are used with the carboxylate polymers are the same as described above for the acrylic acid-vinyl sulphonate copolymers.

Yet, another class of polymeric dispersants are the low molecular weight sulphonated copolymers of styrene and maleic anhydride. These materials are preferably present as the sodium salt of sulphonated copolymers of styrene and maleic anhydride and are typically known and commercially sold as Versa TL ®-3[2] products. Other sulphonated copolymers of styrene and maleic anhydride are also found useful in this application when combined with the above-described carboxylate polymers having sequestrant properties.
[2]Registered Trademark of National Starch and Chemical Corporation To summarize with respect to the most preferred operational method, it may be stated that the preferred method of treating hardness present in boiler waters which are in contact with heat transfer surfaces to prevent and remove scale caused by such hardness comprises treating such waters with:
(a) a water-soluble anionic vinyl polymer containing at least 30% by weight off a carboxylate functionality, said polymer having a molecular weight within the range of 500-50,000, and
(b) a second anionic water-soluble vinyl polymer dispersant.

To summarize with respect to the most preferred polymeric dispersants, it may be stated that the boiler waters are preferably simultaneously treated with both the sequestrant (chelant) water-soluble anionic vinyl polymer mentioned above and a second anionic water-soluble vinyl polymer dispersant chosen from the group consisting of carboxylate-containing, water-soluble vinyl polymers, vinyl sulphonate-acrylic acid copolymers, vinyl sulphonate-methacrylic acid copolymers, sulphonated styrene-maleic anhydride copolymers, and acrylamide-acrylic acid copolymers.

It is particularly interesting to note that most of the chelant or sequestrant anionic vinyl polymers show an ability to disperse solids in boiler water systems if treatment levels are below those required to chelate hardness ions. As a result of this observation, the chelant or sequestrant polymer may be used in quantities above those quantities necessary to chelate all of the hardness initially found in the boiler system. When this occurs, it has been observed that any hardness ions or scale existing in the boiler system may be removed from the system and the additional chelant polymer may act as a dispersant, as well as a sequestrant for hardness contamination.

Thus, the expression and related terms relating to the addition of a second anionic water-soluble vinyl polymer dispersant in combination with the sequestrant polymer is meant to include the phenomenon described above, i.e., use of excess sequestrant polymer to provide both sequestration and dispersancy.

Ratio of Sequestrant to Dispersant Polymers

The ratio of carboxylate polymer to acrylic acid-vinyl sulphonate copolymer, when they are used, is within the range of 30:1 to 1:30 with 20:1 to 30:1 being a preferred range, with 20:1 being most preferred.

In general, the ratio of sequestrant carboxylate polymer to dispersant polymer is also within the range of 30:1 to 1:30. A preferred sequestrant polymer to dispersant polymer ratio is between 30:1 and 10:1 with a most preferred ratio of sequestrant polymer to dispersant polymer being 20:1. In all cases, this ratio is on a weight:weight basis.

To illustrate the many advantages of the invention, the following is presented by way of example.

Experimental

For purposes of understanding the following tests, a series of various polymers and known boiler water treatment chemicals were evaluated. These evaluations were performed in two series of testing programs. The first testing program involved the measurement of the chelation values of various polymers so as to determine by initial screening the potential of each polymer to function adequately as a boiler transport material.

The experimental design used to test the chelation value of a series of polymers was as follows:

Solutions of calcium or magnesium ions were titrated with solutions of various polymeric and other sequestering agents. The residual unsequestered metal ion concentration (or, more correctly, activity) was measured by means of a Specific Ion Electrode (henceforth S.I.E.). This data was ultimately converted to graphical representations of sequestrant performance. Sequestrant performance for Ca ion was measured by a calcium specific electrode, manufactured by Orion Research, Model 93-20. Sequestrant performance for Mg ion was measured by a Divalent cation electrode, Model 93-32, again manufactured by Orion Research. The electrode response is measured, as the sequestrant solution is added incrementally to the hardness solution. The desired solution pH is automatically maintained by feeding potassium hydroxide solution from a Mettler DV10 which is controlled by a Mettler DK10/11 system.

A short period of time is allowed after each sequestrant addition before taking a reading so that the electrode can come to equilibrium with the solution. Noise levels are typically ±0.2 mV using mechanical stirring (higher using a magnetic stirrer).

Prior to each titration, the S.I.E. was calibrated with standard solutions containing 1,000, 100, 10, and 1 ppm calcium or magnesium.

The S.I.E. responds to activity rather than concentration. For calcium measurements, a high, constant, ionic strength is maintained by addition of 6 g/l potassium chloride to all solutions (i.e., standards, sequestrant, and calcium sample). This maintains a constant activity coefficient for the calcium ion. The divalent sensing electrode used for magnesium measurements is subject to interference from both sodium and potassium ions at fairly low concentrations so no ionic strength buffer can be used in this case.

Typical opeating conditions were 2 or 3 g/l active polymeric sequestrant titrated against (in all cases) 100 ml of 100 ppm metal ion. Under these conditions, most titrations were essentially complete after the addition of 40-50 ml of sequestrant. Sequestrant solutions were usually added in 2 to 3 ml increments. Sequestrant was added slowly so as to avoid the formation of bubbles which could be trapped at the base of the electrodes and result in incorrect readings.

All measurements were made at room temperature (measurements above about 40° C. will result in rapid electrode deterioration).

The data from these experiments was graphically displayed or preferably converted to a usable form by a computer program which was written specifically for these experiments. The computer program obtains the best straight line fit through the origin using a reiterative, least-squares approach, allowing calculation of chelation value for each polymeric species.

For calcium measurements, a pH of 10 was used in most cases. Initial studies gave results indicating chelation greater than theoretical. At a pH of 9, the results were in good agreement with theory. The discrepancy at pH 10 may be due to a competing reaction (e.g., magnesium hydroxide formation). All magnesium measurements were made at a pH of 9 after this.

An attempt was made to correct magnesium results for the effects of any sodium present. However, when corrections obtained from sodium chloride solutions were applied to an NTA.Na$_3$.H$_2$O titration, the "corrected" results were very unreasonable (much greater than theoretical chelation). No further attempts to correct for sodium were made.

Chelation values were determined from the initial slope of the titration curve which plots percent metal ion sequestered versus grams of active polymer added. This calculation gives practical chelation values in that no consideration has been given to which complexes are formed, the effects of competing equilibria, or various stability constants.

In the case of the polymers studied, a comparison of chelation values may be more valid than they might be in the case of strong complexing agents, such as EDTA or NTA, where a simple comparison of chelation values is not necessarily a good guide to chelation performance.

As later results will show, to be effective as a transport agent in boilers, the chelation value for the polymeric sequestrant must be above 200 and must give clear solutions for both calcium and magnesium ion test solutions. The preferred average chelation value is above 300. Most of the polymers tested appeared to sequester magnesium ion better than they were able to sequester calcium ion. However, to be successful, a polymer must have, as stated above, a chelation value above 200, preferably above 300, and be able to sequester both calcium ions and magnesium ions to give clear solutions.

The data in Table I compares different sequestrants and the chelation values obtained using the above described test. As can be seen from this Table, the sequestrants tested include not only well-known complexing agents such as EDTA and NTA but also polymeric sequestrants, as well as other sequestrants. As will be shown later, only those sequestrants which have chelation values above 200 can be shown to function as effective transport agents in a boiler system.

Other sequestrants on the list are not satisfactory as transport agents because of known thermal degradation in a boiler system. Such agents are the phosphate containing compounds listed in Table I.

Table II identifies each of the polymeric species tested.

Table III lists results for the polymeric sequestrants of this invention, as well as other more common sequestrants versus magnesium ion. Again, as can be seen, those polymeric sequestrant agents which have chelation values above 200 and are thermally stable give excellent results in boiler transport. Of particular note in Table III is the result for citric acid. Although, a very large chelation value is obtained, this material does not effectively transport magnesium or calcium hardness when tested in the boiler. It is expected that these results are due to the fact that citric acid thermally decomposes when exposed to boiler operating conditions. This very well may be the benefit for the low molecular weight polymeric carboxylate polymers of this invention, that is, that thermal stability is obtained while maintaining sequestrant activity for hardness ions at proper dosages.

Of particular note in Table III is the fact that Polymer C, though giving a chelation value in excess of 200, yields a somewhat cloudy solution with magnesium at pH 9 and would not be expected to perform as well as the other carboxylate containing polymeric sequestrants of this invention. This problem might be solved by increasing the concentration of this polymer or by combining this polymer with other materials giving improved results. The polymeric materials that did not perform well with calcium were not tested for magnesium since both ions must be complexed before adequate boiler transport systems can be achieved.

TABLE I

| Product | Sequestrants vs. $Ca^{++}$, pH = 10 | | | |
|---|---|---|---|---|
| | % Active | M.W. | C.V.* | Mole Ratio |
| EDTA | 100 | 292 | 347 | 1.01 |
| NTA | 100 | 191 | 541 | 1.03 |
| Citric Acid | 100 | 192 | 392 | 0.75 |
| 1,2,4-tricarboxy-2 phosphono-butane | 50 | 256 | 610 | 1.56 |
| amino-tri (methylene-phosphonic) acid | 50 | 299 | 559 | 1.67 |

TABLE I-continued

Sequestrants vs. Ca++, pH = 10

| Product | % Active | M.W. | C.V.* | Mole Ratio |
|---|---|---|---|---|
| diethylene triamine-penta (methylene phosphonic) acid | 50 | 573 | 701 | 4.01 |
| hexa-potassium salt of hexamethylenediamine tetra (methylene phosphonic) acid | 23 | 492 | 282 | 1.39 |
| **1-hydroxy ethylidine-1, 1-di phosphonic acid | 60 | 206 | 961 | 1.98 |
| **Sodium tri-poly phosphate | 100 | 368 | 553 | 1.4 |
| Polymer A | 25.5 | 1000–5000 (ave 2300) | 479 | 13.9 |
| Polymer B | 50 | 2500–7500 (ave 5100) | 374 | 19.1 |
| Polymer C | 100 | 1000–2000 (ave 1600) | 294 | 4.7 |
| Polymer D | 25 | 2500–7500 (ave 4900) | 386 | 18.9 |
| Polymer E | 65 | 1000–3000 (ave 2100) | 300 | 6.3 |
| Polymer F | 50 | Not available | 300 | — |
| Polymer G | 22.75 | " | 291 | — |
| Polymer H | 31.6 | " | 252 | — |
| Polymer I | — | — | 145 | — |
| Polymer J | — | — | 105 | — |
| Polymer K | — | — | 19 | — |

*Chelation values calculated on the basis of 100% active material for all cases.
**Produced cloudy solutions.

TABLE II

Polymer Identification

| Polymer | Chemical Designation | Mole Wt. |
|---|---|---|
| Polymer A | Polyacrylic Acid | 1000–5000 (ave 2300) |
| Polymer B | Polyacrylic Acid | 2500–7500 (ave 5100) |
| *Polymer C | Styrene-maleic anhydride 1:1 copolymer | 1000–2000 (ave 1600) |
| *Polymer D | Vinyl sulfonate-acrylic acid 1:3 copolymer | 2500–7500 (ave 4900) |
| Polymer E | Polyacrylic acid | 1000–3000 (ave 2100) |
| Polymer F | Polymaleic anhydride | (est.) 700–3500 |
| *Polymer G | Acrylic acid-acrylamide 4:1 copolymer | not avail. - below 50,000 |
| *Polymer H | Acrylic acid-acrylamide 3:1 copolymer | not avail. - below 50,000 |
| Polymer I | Hydrolyzed polyacrylonitrile | not avail. - below 50,000 |
| Polymer J | Sodium salt of sulfonated co-polymer of styrene and maleic anhydride | not avail. - below 50,000 |
| Polymer K | Acrylic acid-acrylamide 1:3 copolymer | (est.)5000–15,000 |

*Ratios are monomer weight ratios

TABLE III

Sequestrants vs. Mg++, pH = 9

| Product | % Active | M.W. | C.V.* | Mole Ratio |
|---|---|---|---|---|
| EDTA Acid | 100 | 292 | 345 | 1.01 |
| NTA Acid | 100 | 191 | 461 | 0.88 |
| Citric Acid | 100 | 192 | 762 | 1.46 |
| Polymer A | 25.5 | — | 910 | — |
| Polymer B | 50 | 2500–7500 (ave 5100) | 691 | 35. |
| Polymer C** | 100 | 1000–2000 (ave 1600) | 281 | 4.5 |
| Polymer D | 25 | 2500–7500 (ave 4900) | 603 | 29.5 |
| Polymer E | 65 | 1000–3000 (ave 2100) | 527 | 9.5 |
| Polymer F | 50 | — | 607 | — |
| Polymer G | 22.75 | — | 291 | — |
| Polymer H | 31.6 | — | 493 | — |

*All results expressed in terms of 100% active materials. C.V. and Mole Ratio expressed as CaCO3
**Produced cloudy solutions Some of the more promising carboxylate-containing polymers having chelation values about 200 were tried in experimental boiler water systems. The experimental boiler is described in the paper, "The Investigation of Scaling and Corrosion Mechanisms Using Process Simulation," by J. A. Kelly, P. T. Colombo, and G. W. Flasch, paper No. IWC-80-10, given at the 41st Annual Meeting, International Water Conference, Pittsburgh, Pa., Oct. 20-22, 1980.

Table IV indicates that formulations and sequestrant polymers chosen to be tested in the experimental boiler program. Included in these tests were a phosphorous-containing sequestrant, as well as a water-soluble polymer which does not contain measurable amounts of carboxylate functionality.

TABLE IV

Test Ingredients for Experimental Boiler Work

| Composition | Ingredients |
|---|---|
| I | 20/1 active ratio Composition II/IV |
| II | Polymer H |
| III | Polymer A |
| IV | Polymer D |
| V | Polyacrylamide (M.W. = 4000) |
| VI | Polymer E |
| VII | Diethylenetriaminepenta (methylene phosphonic acid) |
| VIII | Ethylene dichloride - Ammonia copolymer (M.W. - 25000–60000) |
| EDTA | Ethylenediaminetetraacetic acid |

The Experimental Scale Boiler

Most of the experiments were conducted at 1,000 psig, 110,000 Btu/ft$^2$-hr heat flux, and 10 concentration cycles. The Composition I polymer was tested more extensively at 250, 600, and 1,500 psig. This laboratory boiler is of the type described in U.S. Pat. No. 3,296,027, which is incorporated herein by reference.

Feedwater was typically deionized water containing 1 ppm Ca, 0.5 ppm Mg, and 0.5 ppm SiO$_2$. Sulfite residual was maintained at 25±5 ppm at 600 psig and 10±5 ppm at 1,000 psig. Boiler water 'O' alkalinity was maintained at 160–180 ppm. The pH of the polymers was adjusted to 9.

The Experimental Boiler Scale Results

A. Dosage Profiles

Dosage Profiles of a number of polymers were obtained under three conditions. It is apparent in FIG. 1 that:
1. the recommended dosage of Comp. I combination polymer for hardness control is about 5.3 ppm active polymers/ppm total hardness at 1,000 psig, and
2. at dosages below the recommended, the combination polymer preferentially transports Ca rather than Mg ions.

Figure 2:
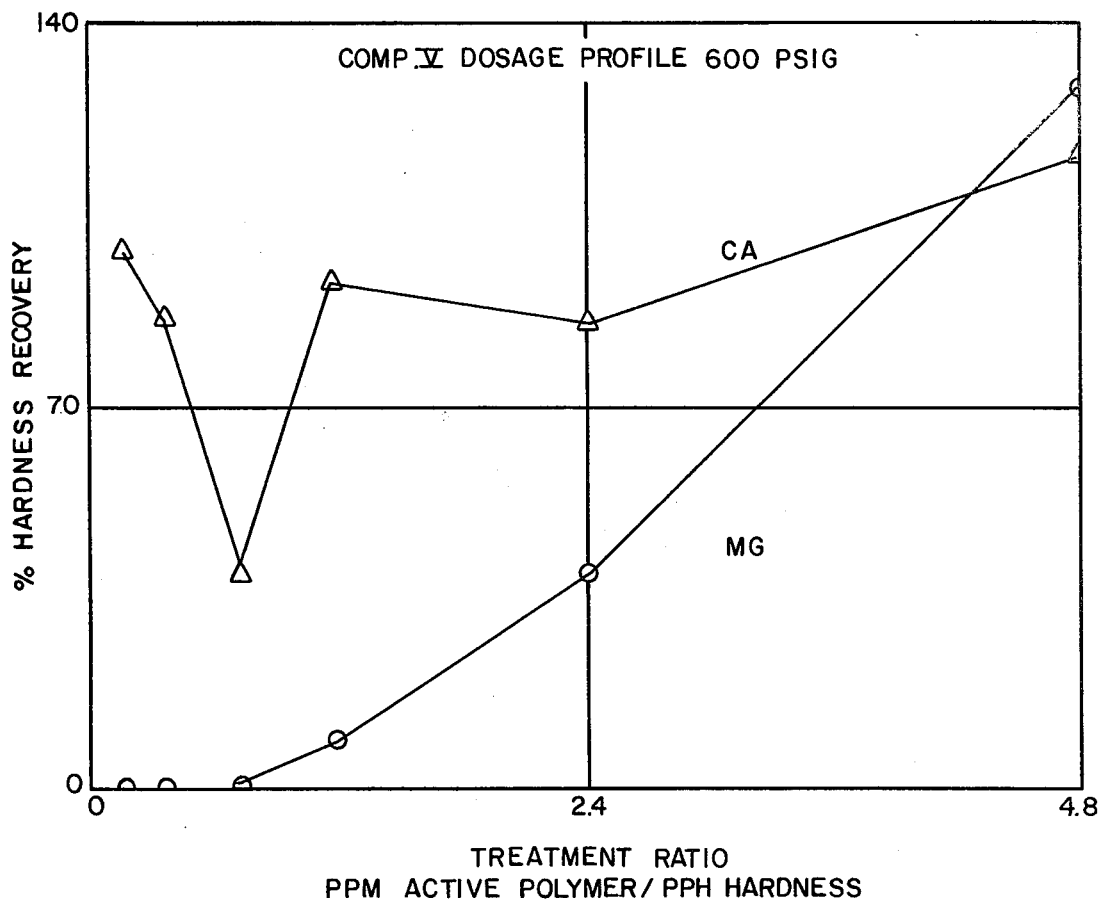
Figure 3:
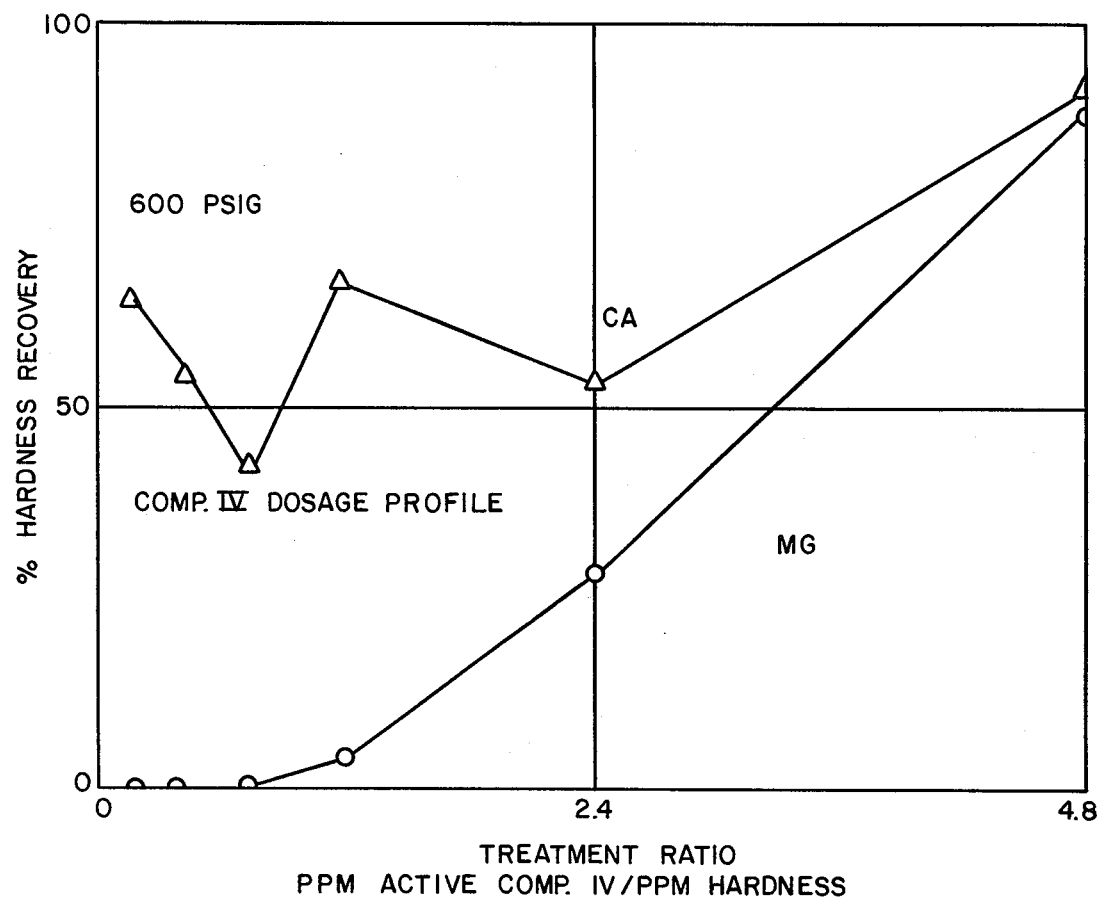

FIGS. 1, 2, and 3 indicate that Comp. I as well as Comp. III and Comp. IV have threshold inhibition capability at low dosages for the Ca ions, and chelate[3] hardness ions at high treatment levels.

In general, all the tested acrylate-, acrylamide-, and vinyl sulphonate-based polymers give excellent hardness control at high dosages, as long as they contain sufficient carboxylate functionality. Among those, Comp. II and IV are the most effective. Results are listed below.

Condition 1:

Boiler Pressure=1,000 psi, Heat Flux=110,000 Btu/ft$^2$-hr, Ca=1, Mg=0.5, SiO$_2$=0.5 ppm in the feedwater.

| Treatment | Treatment Ratio[4] | % Ca Recovery | % Mg Recovery |
|---|---|---|---|
| Comp. I | 0.53 | 16 | trace |
| | 1.05 | 41 | 6 |
| | 2.1 | 75 | 47 |
| | 3.15 | 40 | 33 |
| | 6.3 | 129 | 141 |
| Comp. III | 4.8 | 66 | 44 |
| | 6.72 | 84 | 73 |
| | 8.64 | 106 | 104 |

[4]Defined as ppm active polymer per ppm total hardness.

Condition 2:

Boiler Pressure=1,000 psi, Heat flux=250,000 Btu/ft$^2$-hr.

Feedwater contained 1 ppm Ca, 0.5 ppm Mg, and 0.5 ppm SiO$_2$.

| Treatment | Treatment Ratio | % Ca Recovery | % Mg Recovery |
|---|---|---|---|
| None | | 47 | trace |
| Comp. II | 6.72 | 118 | 101 |
| | 8.64 | 122 | 114 |
| Comp. I | 4.2 | 90 | 78 |
| | 5.25 | 96 | 89 |
| | 6.3 | 107 | 107 |
| | 7.25 | 109 | 117 |
| | 8.09 | 107 | 112 |
| | 9.03 | 104 | 109 |
| Comp. III | 8.64 | 102 | 105 |
| | 9.6 | 99 | 106 |
| Comp. III + 1 ppm | 8.64 | 101 | 102 |
| Comp. VII | 9.6 | 102 | 108 |
| Comp. VI | 8.64–9.6 | 127 | 118 |
| Comp. V | 8.64 | 82 | 120 |
| Comp. IV | 8.64 | 112 | 105 |

Condition 3:

Boiler Pressure=600 psi, Heat Flux=110,000 Btu/hr-ft$^2$, Ca=1, Mg=0.5, SiO$_2$=0.5 ppm in the feedwater

| Treatment | Treatment Ratio | % Ca Recovery | % Mg Recovery |
|---|---|---|---|
| Comp. IV | 0.15 | 104 | trace |
| | 0.3 | 87 | trace |
| | 0.6 | 41 | trace |
| | 1.2 | 94 | 8 |
| | 2.4 | 87 | 41 |
| | 4.8 | 120 | 132 |
| Comp. III | 0.15 | 67 | trace |
| | 0.3 | 55 | trace |
| | 0.6 | 42 | trace |
| | 1.2 | 73 | 4 |
| | 2.4 | 53 | 29 |
| | 4.8 | 93 | 90 |

| Treatment | Treatment Ratio | % Ca Recovery | % Mg Recovery |
|---|---|---|---|
| Comp. VI | 0.15 | 64 | trace |
| | 0.3 | 57 | trace |
| | 0.6 | 42 | trace |
| | 1.2 | 72 | trace |
| | 2.4 | 67 | 32 |
| | 4.8 | 104 | 86 |
| Comp. VIII | 0.3 | 53 | trace |
| | 4.8 | 54 | trace |
| | 25.0 | 114 | 16 |

B. Comp. I Performance at 1,500 psig

Higher recommended dosage is required for hardness control at higher boiler pressure. the increase in treatment level is probably due to the decomposition of polymer.

As the data below indicate, the dosage required for a complete hardness recovery increased at 1,500 psig. Corrosion rate, as measured by the iron content in the blowdown, did not increase.

Ca=1, Mg=0.5, SiO$_2$=0.5 ppm in the feedwater.
Pressure=1,500 psig, heat Flux=110,000 Btu/ft$^2$-hr

| Polymer | Treatment Ratio | % Ca Recovery | % Mg Recovery |
|---|---|---|---|
| Comp. I | 15.75 | 89 | 105 |
| | 21.0 | 99 | 108 |
| | 26.25 | 99 | 107 |

C. Comp. I Performance at 250 psig

The combination polymer had no problem controlling hardness at low pressure (250 psi) boiler applications.

Heat flux was 110,000 Btu/ft$^2$-hr.

Condition 1:

Feedwater contained Ca=3, Mg=1.5, Na$_2$SO$_4$=42.6, NaCl=10, SiO$_2$=5, Fe=1 ppm, and enough NaHCO$_3$ to give an M alkalinity 40 in the feedwater or 400 in boiler water, SO$_3^=$=30 ppm in the blowdown.

| Treatment Ratio | Recovery | | | | |
|---|---|---|---|---|---|
| | % Ca | % Mg | % SiO$_2$ | % Fe | % Na$_2$SO$_4$ |
| 5.04 | 116 | 87 | 101 | 94 | 113 |
| 10.08 | 113 | 107 | 95 | 95 | 111 |
| 20.16 | 115 | 122 | 92 | 96 | 109 |

Condition 2:

Feedwater Contained 3 ppm Mg and all the other components listed in 1.

| Treatment Ratio | Recovery | | | | |
|---|---|---|---|---|---|
| | % Ca | % Mg | % SiO$_2$ | % Fe | % Na$_2$SO$_4$ |
| 3.78 | 113 | 57 | 83 | 96 | 107 |
| 7.56 | 112 | 79 | 88 | 91 | 116 |
| 15.12 | 113 | 136 | 99 | 85 | 116 |

D. Effect of Hardness and Silica Upsets on Comp. I

Comp. I treatment can recover from moderate hardness, silica, and treatment upsets.

Condition 1:

Pressure of the boiler=1,000 psig, Heat flux=110,000 Btu/hr-ft². Comp. I treatment ratio was 7.88 ppm polymer/ppm hardness when initial hardness was 1 ppm Ca and 0.5 ppm Mg. Total polymer held constant throughout the test as hardness was varied.

| Feedwater | | | Recovery | | | | Total Hardness* | |
|---|---|---|---|---|---|---|---|---|
| Ca ppm | Mg ppm | SiO₂ ppm | % Ca | % Mg | % SiO₂ | Fe ppm | by AA | by titration |
| 1.0 | 0.5 | 0.5 | 116 | 112 | 102 | 0.5 | 17.2 | 16.6 |
| 2.0 | 1.0 | 1.0 | 70 | 66 | 62 | 0.4 | 20.7 | 19.5 |
| 1.0 | 0.5 | 1.0 | 111 | 102 | 97 | 0.3 | 16.2 | — |
| 5.0 | 2.5 | 2.5 | 39 | 32 | 45 | 0.3 | 27.2 | 26.5 |
| 1.0 | 0.5 | 0.5 | 116 | 128 | 134 | 0.1 | 18.1 | — |

*Total Hardness calculated as CaCO₃

Condition 2:
Ca/Mg/SiO₂ Swing Effect
1,000 psi and 250,000 Btu/hr-ft²

| Polymer | Treatment Ratio | Ca/Mg/SiO₂, ppm in F.W. | Recovery | |
|---|---|---|---|---|
| | | | % Ca | % Mg |
| Comp. II | 8.64 | 1/0.5/0.5 | 122 | 114 |
| | 6.72 | 1/0.5/0.5 | 118 | 101 |
| | 6.72 | 0.5/1/0.5 | 146 | 87 |
| | 6.72 | 0.5/1/2.0 | 147 | 82 |
| Comp. IV | 8.64 | 1.0/0.5/0.5 | 132 | 107 |
| | 8.46 | 0.5/1/0.5 | 109 | 95 |
| | 8.64 | 0.5/1/2.0 | 94 | 81 |
| | 17.28 | 2/1/1 | 91 | 84 |

Condition 3—For Comp. I:
Feedwater contained 1 ppm Ca, 0.5 ppm Mg, and 2.5 ppm SiO₂, 1,000 psi and 110,000 Btu/hr-ft².

| Treatment Ratio | % Ca Recovery | % Mg Recovery | % SiO₂ Recovery |
|---|---|---|---|
| 7.88 | 100 | 97 | 103 |
| 15.75 | 106 | 149 | 102 |

E. Scale Removal Using Comp. I

Scale removal using Comp. I appears feasible if hardness and silica can be discharged by the blowdown. Adequate Comp. I treatment can transport boiler deposits in addition to the hardness in the feedwater. It enhanced passivation of the boiler heat transfer surface and formed a black, magnetite film.
Condition 1:
Feedwater contained Ca=1, Mg=0.5, and SiO₂=0.5 ppm
Pressure=1,000 psig, Heat flux=110,000 Btu/hr-ft²

| Treatment Ratio | Recovery | | | | Total Hardness | |
|---|---|---|---|---|---|---|
| | % Ca | % Mg | % SiO₂ | Fe ppm | By AA | By titration |
| 3.93 | 88 | 71 | 112 | trace | 12.7 | 12.8 |
| 7.88 | 140 | 183 | 104 | trace | 21.2 | 17.8 |
| 15.75 | 168 | 218 | 156 | 0.6 | 27.7 | 24.6 |

Condition 2:
Feedwater contained no hardness and no silica, a badly fouled boiler.
Pressure=1,000 psig, Heat flux—110,000 Btu/hr-ft².

| Treatment Ratio (assume hardness = 1 ppm) | Recovery | | | | | Total Hardness* | |
|---|---|---|---|---|---|---|---|
| | Ca ppm | Mg ppm | SiO₂ ppm | Fe ppm | PO₄ ppm | By AA | By titration |
| 23.63 | 10.2 | 16.4 | 6.5 | 0.7 | 10.7 | 23.4 | 23.4 |
| 47.25 | 18.1 | 15.9 | 6.8 | 0.8 | 12.2 | 35.9 | 24.1 |
| 70.88 | 24.9 | 21.9 | 8.1 | 1.6 | 16.1 | 46.7 | 44.3 |

*Total Hardness calculated as CaCO₃

Condition 3:
Feedwater contained no hardness and no silica and the boiler was relatively clean.
Pressure=1,000 psig, Heat flux=110,000 Btu/hr-ft².
Treatment=23.63 ppm Comp. I per ppm total hardness, assuming total hardness=1 ppm.

| No. of Days | Recovery | | | |
|---|---|---|---|---|
| | Ca ppm | Mg ppm | SiO₂ ppm | Fe ppm |
| 0 | 3.6 | 5.0 | 11.5 | 5.8 |
| 5 | 1.8 | 1.7 | 2.9 | 1.3 |
| 6 | 1.7 | 1.4 | 1.5 | 1.4 |
| 7 | 2.1 | 1.4 | 1.1 | 0.9 |
| 8 | 2.2 | 1.3 | 0.5 | 1.2 |

F. The Effect of Heat Flux on Comp. I Performance

Heat flux in the range of 110,000 to 250,000 Btu/hr-ft² had little influence on hardness recovery. At heat fluxes greater than 300,000 Btu/hr-ft² there was a thin film of deposition on the heat transfer surface.
Test Condition: 1,000 psi
Feedwater contained 1 ppm Ca, 0.5 ppm Mg, and 0.5 ppm SiO₂.

| Heat Flux Btu/hr-ft² | Treatment Ratio | Recovery | | |
|---|---|---|---|---|
| | | % Ca | % Mg | % SiO₂ |
| 100,000 | 9.03 | 112 | 140 | 117 |
| 300,000 | 9.03 | 121 | 171 | 122 |

G. Performance of Other Combination Polymers

Comp. III/Comp. IV combination polymer, although less effective than Comp. I, gave reasonable hardness control at 1,000 psig. This combination polymer could be used in NH₃ sensitive applications.
Conditions:
Ca=1, Mg=0.5, SiO₂=0.5 ppm in the feedwater.
Pressure=1,000 psig, Heat Flux=110,000 Btu/ft²

| Treatment Ratio | % Ca Recovery | % Mg Recovery |
|---|---|---|
| 7.88 | 86 | 91 |
| 10.5 | 99 | 111 |
| 13.12 | 102 | 108 |

Experimental Boiler Results

The combination polymer Comp. I was initially added to the boiler at a dosage of 7.9 ppm active per ppm total hardness. The dosage was maintained for eight days. The average calcium and magnesium recoveries were 118% and 101%, respectively. Initial hydrogen level was 11 ppb but dropped to 1.5 ppb the same day. It leveled off to 0.4 ppb. Hydrogen values of 1.0-1.2 ppb are equivalent to background levels. The high initial rise of hydrogen frequently occurs in a boiler just brought on line. In addition, sulfite residuals for the first few days were lower than desired and contributed to hydrogen generation. Iron in the blowdown started off high at 2-3 ppm and declined to 1.1 ppm after eight days. The condensate frequently had a pH greater than 9, and contained small amounts of ammonia.

At this point the polymer dosage was decreased to 3.9 and the test was continued at this condition for six days. This treatment level is less than ⅔ the recommended. The average calcium and magnesium recoveries for this period were 96% and 81%, respectively. It was anticipated from the experimental scale boiler results that hardness recoveries would decline and that magnesium would be more affected than calcium. Hydrogen dropped to 0.3 ppb and iron decreased to 0.3 ppm. The temperature of the high seat flux area remained constant, indicating no scaling.

At this point, the polymer dosage was further reduced to 2.6 and held at this condition for three days. Calcium and magnesium recoveries declined to 89% and 78%, respectively, while hydrogen and iron levels were fractionally lower. During low level treatment, the temperature in the horizontal test section increased 30° F. which indicated that scale was being deposited.

The polymer dosage was then restored to the original level of 7.9 for fifteen days. Within the first day, the temperature of the horizontal test section dropped 30° F. As anticipated, calcium and magnesium recoveries increased dramatically and averaged 122% and 111%, respectfully. These high recovery values suggest that the polymer treatment program is removing deposits previously laid down when under-treating. Similarly, it is postulated that at the start of this test, the 118% calcium recovery was due to removal of boiler deposits that remained in the system from the previous test. Hydrogen and iron remained at relatively low levels.

Figure 4:
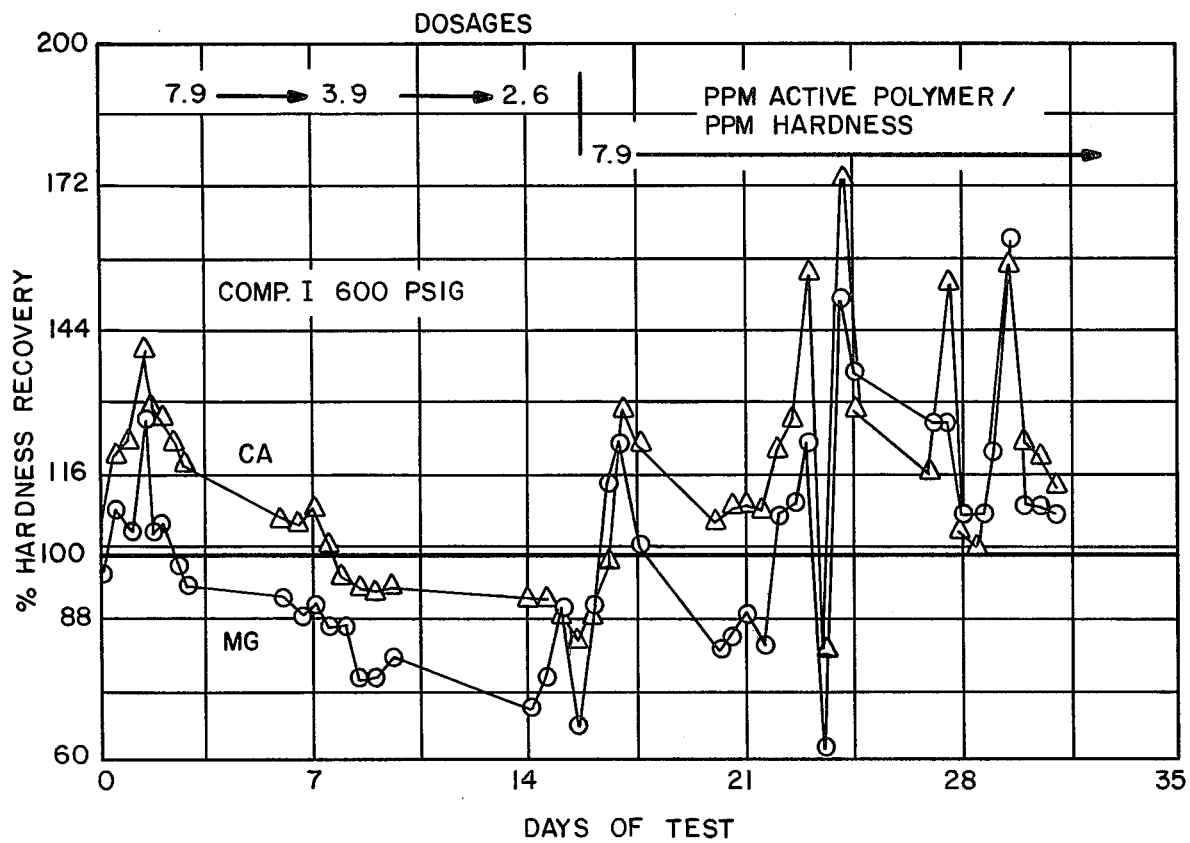
Figure 5:
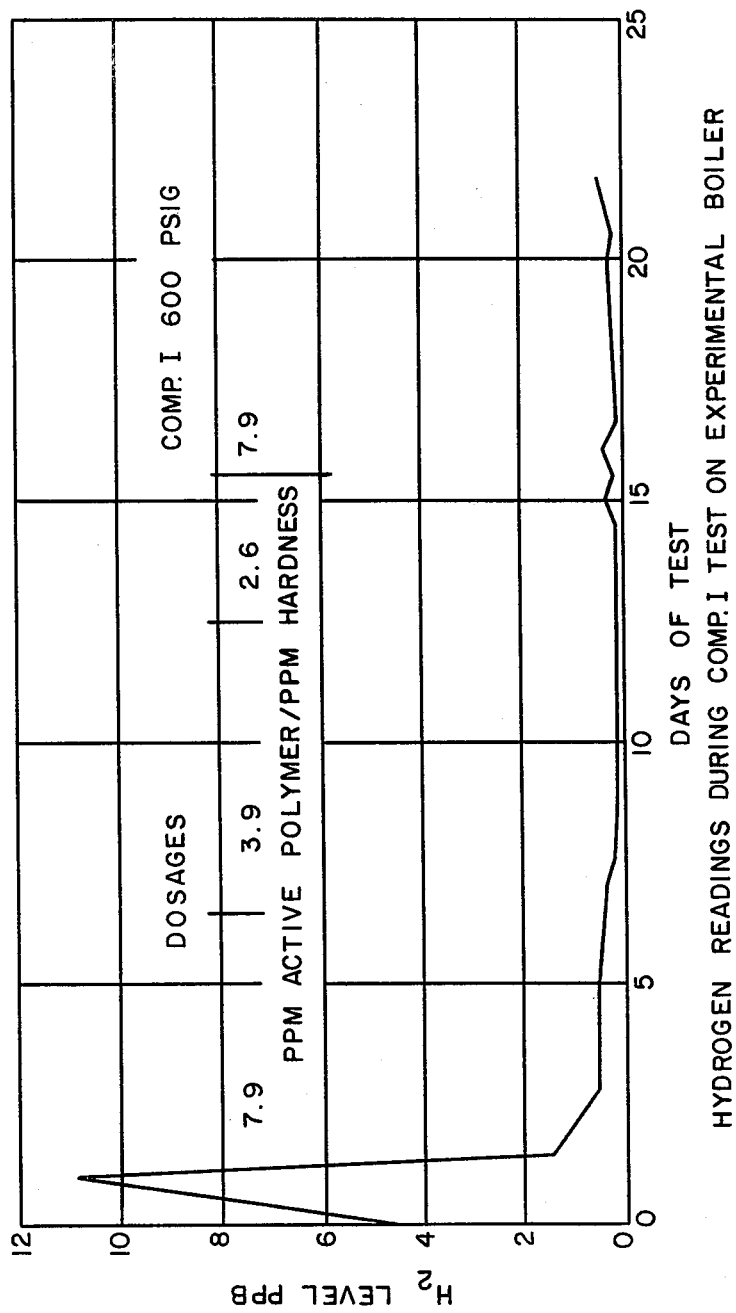
Figure 6:
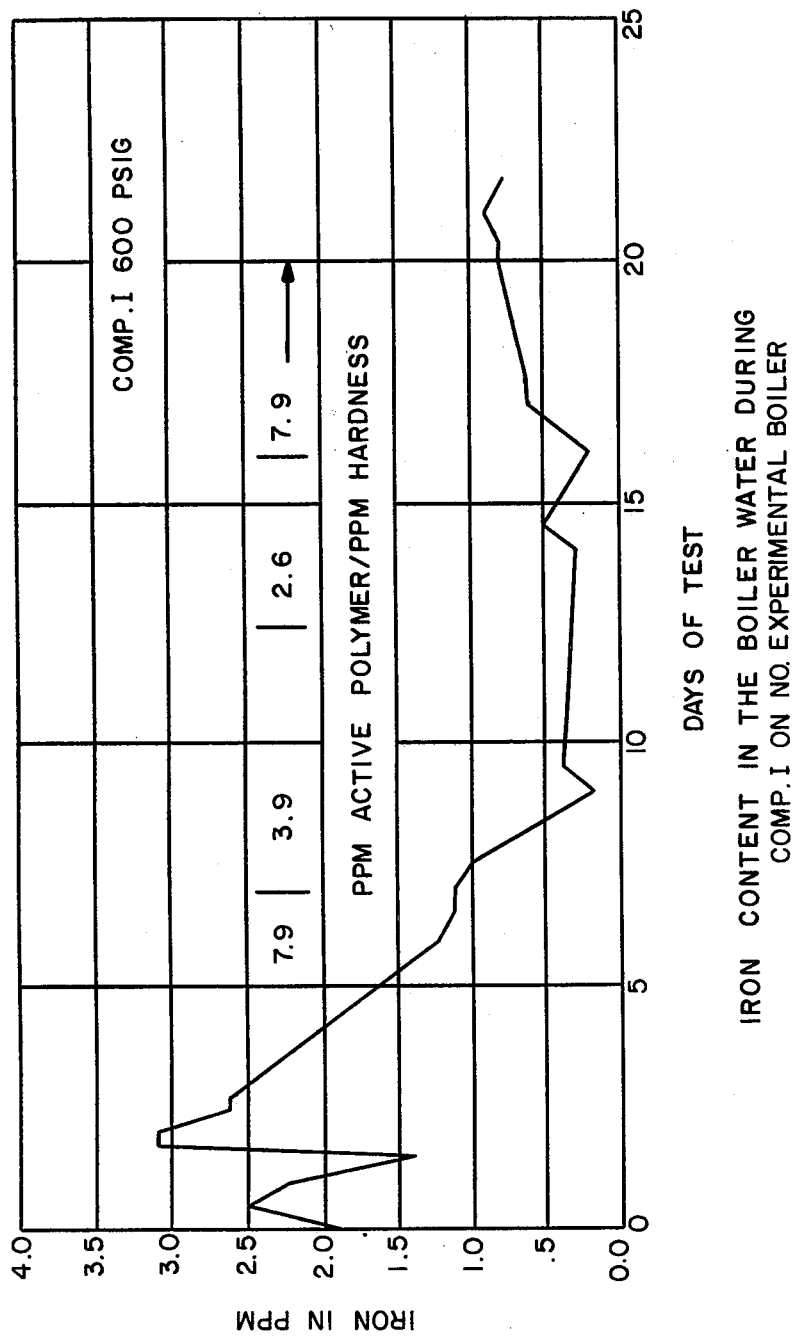

FIGS. 4, 5, and 6 depict percent hardness recovery, $H_2$ level, and iron level in the blowdown as a function of days of test. Polymer treatment was then stopped for 7 days. Only trace amounts of calcium and magnesium were recovered during this period, while hydrogen and iron remained virtually unchanged.

During the remaining period of the test, polymer dosage at 7.9 was alternated with no treatment. In the presence of polymer, recoveries of calcium and magnesium averaged 115% and 106%, respectfully.

Having thus described our invention, we claim as follows:

1. A method of treating hardness present in boiler waters which are in contact with heat transfer surfaces to prevent formation of scale on, and to remove previously formed scale from, these heat transfer surfaces which comprises treating the boiler waters with a water-soluble sequestrant anionic vinyl polymer containing at least 30% by weight of carboxylate functionality, said polymer having a molecular weight within the range of 500-50,000 and a chelation value of at least 200 which chelation value represents the milligrams of calcium or magnesium expressed in terms of calcium carbonate complexed by one gram of a sequestrant, and with the amount of said sequestrant anionic vinyl polymer being within the range of 1-30 ppm per ppm hardness present in such boiler waters, whereby the hardness in the boiler waters is sequestered by the water-soluble sequestrant anionic vinly polymer thereby preventing formation of scale on, and removing previously formed scale from, the heat transfer surfaces of boilers.

2. The method of claim 1 wherein the water-soluble sequestrant anionic vinyl polymer has a molecular weight within the range 1000-30,000 and has a chelation value of at least 300.

3. The method of claim 3 wherein the boiler water which contains hardness is treated with from 3-15 ppm of the water-soluble sequestrant anionic vinyl polymer per ppm of hardness present in said boiler water.

4. The method of claim 1 wherein the boiler water which contains hardness is treated with from 3-15 ppm of the water-soluble sequestrant anionic vinyl polymer per ppm hardness present in said boiler water.

5. The method of claim 1 wherein the water-soluble sequestrant anionic vinyl polymer is chosen from the group consisting of:
   (a) homopolymers of acrylic acid, methacrylic acid, maleic acid, fumaric acid, and itaconic acid, and
   (b) copolymers of the monomers of group (a) above with acrylamide and vinyl sulfonate, and
   (c) hydrolyzed polyacrylamide.

6. The method of claim 1 wherein the boiler water which contains hardness is simultaneously treated with a second water-soluble anionic vinyl polymeric dispersant which includes the water soluble sequestrant which is used in excess to provide both sequestration and dispersancy, and the weight ratio of water-soluble sequestrant anionic vinyl polymer to the second water-soluble anionic vinyl polymeric dispersant is within the range of 30:1 to 1:30.

7. The method of claim 6 wherein the second water-soluble anionic vinyl polymeric dispersant has a molecular weight in the range of 500 to about 50,000.

8. The method of claim 7 wherein the second water-soluble anionic vinyl polymeric dispersant is chosen from the group consisting of carboxylate-containing, water-soluble vinyl polymers, acrylic acid-vinyl sulfonate copolymers, acrylic acid homopolymers, vinyl sulfonate-methacrylic acid copolymers, sulfonated styrene-maleic anhydride copolymers, and acrylamide-acrylic acid copolymers.

9. The method of claim 8 wherein the acrylic acid acid-vinyl sulfonate copolymers have a molecular weight in the range of 900-15,000; and the acrylic acid homopolymers have a molecular weight in the range of 2000-4000.

10. The method of claim 6 wherein the second water-soluble anionic vinyl polymeric dispersant is a water-soluble acrylic acid-vinyl sulfonate copolymer having:
    (a) 5-25 mole percent vinyl sulfonate;
    (b) 95-75 mole percent acrylic acid; and
    (c) a molecular weight in the range of 1000-6000.

11. The method of claim 10 wherein the water-soluble acrylic acid-vinyl sulfonate copolymer has a molecular weight in the range of 2000-4000.

12. The method of claim 10 wherein the water-soluble acrylic acid-vinyl sulfonate copolymer is present at a weight ratio of between 1:30 to 1:20 based on the water-soluble sequestrant anionic vinyl polymer.

13. The method of claim 6 wherein the second water-soluble anionic vinyl polymeric dispersant is present at a weight ratio between 30:1 to 1:30 based on the water-soluble sequestrant anionic vinyl polymer.

14. The method of claim 13 wherein the second water-soluble anionic vinyl polymeric dispersant is an acrylic acid vinyl sulfonate copolymer which is present at a weight ratio of between 1:30 to 1:20 based on the water-soluble sequestrant anionic vinyl polymer.

* * * * *

UNITED STATES PATENT AND TRADEMARK OFFICE
CERTIFICATE OF CORRECTION

PATENT NO. : 4,457,847

DATED : July 3, 1984

INVENTOR(S) : Walter F. Lorenc, John A. Kelly & Fredrick S. Mandel

It is certified that error appears in the above-identified patent and that said Letters Patent are hereby corrected as shown below:

On the title page;

Inventors: John "G." Kelly should read John -A.- Kelly

Rferences Cited - U. S. Patent Documents - should be added 2,723,956, Johnson, 1955
        2,729,557, Booth, 1956
        3,630,937, Baum, 1971
        3,650,970, Pratt, 1972
        3,715,307, Johnson, 1973
        3,890,228, Hwa et al, 1975
        3,898,037, Lange et al, 1975
        3,904,635, Senoo et al, 1975
        3,928,196, Persinski et al, 1975
        3,933,673, Davies, 1976
        3,941,562, Hellingshad, 1976
        3,948,792, Watsen et al, 1976
        3,959,167, Hwa et al, 1976
        3,965,028, O'Brien et al, 1976
        3,989,636, Domba, 1976
        3,992,318, Gaupp et al, 1976
        4,361,492, Dubin, 1982

FOREIGN PATENT DOCUMENTS - should be added
1,216,781, United Kingdom, 1970

OTHER PUBLICATIONS - should be added

Kirk-Othmer Encyclopedia of Chemical Technology, Vol. 1, Interscience, New York, 1963 Second Edition

UNITED STATES PATENT AND TRADEMARK OFFICE
CERTIFICATE OF CORRECTION

PATENT NO. : 4,457,847

DATED : July 3, 1984

INVENTOR(S) : Walter F. Lorenc, John A. Kelly & Fredrick S. Mandel

It is certified that error appears in the above-identified patent and that said Letters Patent are hereby corrected as shown below:

Column 1, line 33, "dispersents" should read -dispersants-

Column 3, line 9, "functionaltiy" should read -functionality-

Column 3, line 62, "off" should read -of-

Column 5, line 24, "opeating" should read -operating-

Column 8, line 11, "about" should read -above-

Column 9, at the bottom of Column 9, should be added
-3 Sequestration may be a more appropriate terminology, however, chelation appears to be the mechanism.-

Colimn 10, line 17, "the" should read -The-

Column 10, line 54, "Contained" should read -contained-

Column 13, line 32, "respectfully" should read -respectively-

Column 13, line 48, "respectfully" should read -respectively-

Claim 3, column 14, line 7, "The method of claim 3" should read -The method of claim 1-

UNITED STATES PATENT AND TRADEMARK OFFICE
CERTIFICATE OF CORRECTION

PATENT NO. : 4,457,847

DATED : July 3, 1984

INVENTOR(S) : Walter F. Lorenc, John A. Kelly & Fredrick S. Mandel

It is certified that error appears in the above-identified patent and that said Letters Patent is hereby corrected as shown below:

Claim 6, column 14, line 26 - 28 "includes the water-soluble sequestrant which is used in excess to provide both sequestration and dispersancy" should read -is capable of dispersing suspended matter in said boiler water,-

Claim 13, column 14, line 59, "is present at a weight ratio between 30:1 to 1:30 based on the water-soluble sequestrant anionic vinyl polymer." should read - includes the water soluble sequestrant which is used in excess to provide both sequestration and dispersancy.-

Signed and Sealed this

Twenty-ninth Day of October 1985

[SEAL]

Attest:

DONALD J. QUIGG

Attesting Officer

Commissioner of Patents and Trademarks—Designate

REEXAMINATION CERTIFICATE (793rd)
United States Patent [19]
Lorenc et al.

[11] B1 4,457,847
[45] Certificate Issued  Dec. 8, 1987

[54] CARBOXYLATE POLYMERS FOR INTERNAL SCALE CONTROL AGENTS IN BOILER SYSTEMS

[75] Inventors: Walter F. Lorenc, Harvey; John G. Kelly, Woodridge, both of Ill.; Fredrick S. Mandel, Baton Rouge, La.

[73] Assignee: Nalco Chemical Company, Oak Brook, Ill.

Reexamination Request:
 No. 90/001,084, Sep. 9, 1986

Reexamination Certificate for:
 Patent No.: 4,457,847
 Issued: Jul. 3, 1984
 Appl. No.: 382,567
 Filed: May 28, 1982

Certificate of Correction issued Oct. 29, 1985.

Related U.S. Application Data

[63] Continuation-in-part of Ser. No. 318,665, Nov. 5, 1981, abandoned.

[51] Int. Cl.$^4$ .................................................. C02F 5/10
[52] U.S. Cl. .................................. 210/698; 134/22.19; 210/701; 252/82; 252/180

[56] References Cited

U.S. PATENT DOCUMENTS

| | | | |
|---|---|---|---|
| 2,327,302 | 8/1943 | Dittmar | 252/132 |
| 2,723,956 | 11/1955 | Johnson | 210/23 |
| 2,729,557 | 1/1956 | Booth et al. | 75/105 |
| 2,783,200 | 2/1957 | Crum et al. | 210/23 |
| 2,980,610 | 4/1961 | Ruehrwein | 210/58 |
| 3,085,916 | 4/1963 | Zimmie et al. | 134/22 |
| 3,285,886 | 11/1966 | Gunderson et al. | 260/80.3 |
| 3,293,152 | 12/1966 | Herbert et al. | 203/7 |
| 3,296,027 | 1/1967 | Jacklin | 134/3 |
| 3,324,063 | 6/1967 | Teot | 260/29.6 |
| 3,331,773 | 7/1967 | Gunderson et al. | 210/58 |
| 3,405,060 | 10/1968 | Carter et al. | 210/701 |
| 3,463,730 | 8/1969 | Booth et al. | 210/58 |
| 3,483,033 | 12/1969 | Casey | 127/61 |
| 3,492,240 | 1/1970 | Hettinger, Jr. | 252/180 |
| 3,505,238 | 4/1970 | Liddell | 252/180 |
| 3,514,376 | 5/1970 | Salutsky | 203/7 |
| 3,515,575 | 6/1970 | Arnold | 117/102 |
| 3,549,538 | 12/1970 | Jacklin | 252/82 |
| 3,549,548 | 12/1970 | Newman | 252/181 |
| 3,578,589 | 5/1971 | Hwa et al. | 210/58 |
| 3,579,455 | 5/1971 | Sabatelli et al. | 252/135 |
| 3,617,577 | 11/1971 | King | 210/701 |
| 3,623,991 | 11/1971 | Sabatelli et al. | 252/180 |
| 3,630,937 | 12/1971 | Baum et al. | 252/181 |
| 3,649,547 | 3/1972 | Lummus | 252/181 |
| 3,650,970 | 3/1972 | Pratt | 252/181 |
| 3,658,710 | 4/1972 | Puckorius et al. | 252/87 |
| 3,663,448 | 5/1972 | Ralston | 252/180 |
| 3,666,664 | 5/1972 | Lorenc et al. | 210/58 |
| 3,682,224 | 8/1972 | Bleyle | 159/47 |
| 3,689,436 | 9/1972 | Stamm | 252/545 |
| 3,692,704 | 9/1972 | Stamm et al. | 252/525 |
| 3,699,048 | 10/1972 | Krueger et al. | 252/180 |
| 3,709,815 | 1/1973 | Boothe et al. | 210/58 |
| 3,709,816 | 1/1973 | Walker et al. | 210/58 |
| 3,715,307 | 2/1973 | Johnson et al. | 210/58 |
| 3,752,761 | 8/1973 | Boothe et al. | 210/58 |
| 3,755,264 | 8/1973 | Testa | 260/78.5 R |
| 3,756,257 | 7/1973 | Rice et al. | 134/3 |
| 3,766,077 | 10/1973 | Hwa et al. | 252/180 |
| 3,790,610 | 2/1974 | Lum et al. | 260/429 J |
| 3,791,978 | 2/1974 | Krueger et al. | 252/180 |
| 3,806,367 | 4/1974 | Lange et al. | 134/3 |
| 3,810,834 | 5/1974 | Jones et al. | 210/58 |
| 3,836,200 | 9/1974 | Booth | 302/66 |
| 3,839,215 | 10/1974 | Mulders | 252/181 |
| 3,856,755 | 12/1974 | Vogt et al. | 260/78.5 T |
| 3,879,288 | 4/1975 | Siegele | 210/58 |
| 3,890,228 | 6/1975 | Hwa et al. | 210/58 |
| 3,898,037 | 8/1975 | Lange et al. | 21/2.7 R |
| 3,904,522 | 9/1975 | Greenfield | 210/58 |
| 3,904,635 | 9/1975 | Senoo et al. | 260/293.86 |
| 3,904,685 | 9/1975 | Shahidi et al. | 260/537 N |
| 3,928,196 | 12/1975 | Persinski et al. | 210/58 |
| 3,933,673 | 1/1976 | Davies | 252/135 |
| 3,941,562 | 3/1976 | Hollingshad | 21/2.7 R |
| 3,948,792 | 4/1976 | Watson et al. | 252/181 |
| 3,950,260 | 4/1976 | Eldib | 252/89 |
| 3,959,167 | 5/1976 | Hwa et al. | 252/180 |

(List continued on next page.)

FOREIGN PATENT DOCUMENTS

| | | |
|---|---|---|
| 490312 | 1/1977 | Australia . |
| 614685 | 2/1961 | Canada . |
| 1057943 | 7/1979 | Canada . |
| 1097555 | 3/1981 | Canada . |
| 1198027 | 12/1985 | Canada . |

OTHER PUBLICATIONS

References and end notes to J. Cowan and D. Weintritt, *Water-Formed Scale Deposits*, pp. 285–293 (1976) (IE).
William E. Bell, *Chemical Cleaning with Citric-Acid Solutions*, Aug. 29, 1960, Paper No. 60-WA-257.
G. W. Bradley, L. D. Martin, W. P. Banks and J. G. Forst, *Investigation of Ammonium Citrate Cleaning Solvents*, Nov. 4–6, 1975, Paper No. IWC 75-18, International Water Conference.

(List continued on next page.)

*Primary Examiner*—Peter A. Hruskoci

[57] ABSTRACT

A method of treating hardness present in boiler waters which are in contact with heat transfer surfaces to prevent and remove scale caused by such hardness which comprises treating such waters with a water-soluble anionic vinyl polymer containing at least 30% by weight of carboxylate functionality with said polymer having a molecular weight within the range of 500–50,000 and with the amount of such polymer being within the range of 1–30 ppm per ppm hardness present in such waters.

In a preferred embodiment, the boiler waters are simultaneously treated with the water-soluble anionic vinyl polymers containing carboxylate functionality and another water-soluble anionic vinyl polymer which has dispersing properties.

B1 4,457,847

Page 2

U.S. PATENT DOCUMENTS

| Number | Date | Name | Class |
|---|---|---|---|
| 3,965,027 | 6/1976 | Boffardi et al. | 252/180 |
| 3,965,028 | 6/1976 | O'Brien et al. | 252/180 |
| 3,989,636 | 11/1976 | Domba | 252/180 |
| 3,992,318 | 11/1976 | Gaupp et al. | 252/389 A |
| 4,001,134 | 1/1977 | Markofsky et al. | 252/180 |
| 4,004,939 | 1/1977 | O'Brien et al. | 106/135 |
| 4,008,164 | 2/1977 | Watson et al. | 252/8.55 B |
| 4,018,702 | 4/1977 | Boffardi et al. | 252/389 R |
| 4,029,577 | 6/1977 | Godlewski et al. | 210/58 |
| 4,048,066 | 9/1977 | Cuisia et al. | 210/58 |
| 4,065,607 | 12/1977 | Kurowsky | 526/15 |
| 4,072,607 | 2/1978 | Schiller et al. | 210/58 |
| 4,085,045 | 4/1978 | Song et al. | 210/58 |
| 4,085,060 | 4/1978 | Vassileff | 252/180 |
| 4,118,318 | 10/1978 | Welder et al. | 210/58 |
| 4,126,549 | 11/1978 | Jones et al. | 210/58 |
| 4,147,627 | 4/1979 | Goodman | 210/58 |
| 4,163,733 | 8/1979 | Buckman et al. | 252/180 |
| 4,171,988 | 10/1979 | Phillips et al. | 134/22 R |
| 4,175,100 | 11/1979 | Schiller et al. | 525/327 |
| 4,186,027 | 1/1980 | Bell et al. | 106/288 |
| 4,209,398 | 6/1980 | Ii et al. | 210/58 |
| 4,255,309 | 3/1981 | Klaessig et al. | 260/29.6 WB |
| 4,267,059 | 5/1981 | Behn et al. | 210/736 |
| 4,271,058 | 6/1981 | Trabitzsch et al. | 260/29.6 M |
| 4,288,327 | 9/1981 | Godlewski et al. | 210/698 |
| 4,301,266 | 11/1981 | Muenster et al. | 526/212 |
| 4,303,568 | 12/1981 | May et al. | 260/29.6 MP |
| 4,314,004 | 2/1982 | Stoneberg | 428/421 |
| 4,326,980 | 4/1982 | Snyder et al. | 252/180 |
| 4,335,220 | 6/1982 | Coney | 523/414 |
| 4,342,652 | 8/1982 | Schiller et al. | 210/698 |
| 4,361,492 | 11/1982 | Dubin | 252/175 |
| 4,374,733 | 2/1983 | Snyder et al. | 210/701 |
| 4,384,979 | 5/1983 | Hansen | 252/389 A |
| 4,545,920 | 10/1985 | Lorenc et al. | 252/180 |
| 4,566,972 | 1/1986 | Bennison et al. | 210/698 |

FOREIGN PATENT DOCUMENTS

| Number | Date | Country |
|---|---|---|
| 0032041 | 7/1981 | European Pat. Off. |
| 1134786 | 8/1962 | Fed. Rep. of Germany |
| 2344498 | 3/1974 | Fed. Rep. of Germany |
| 2405192 | 8/1974 | Fed. Rep. of Germany |
| 2434816 | 5/1976 | Fed. Rep. of Germany |
| 2643422 | 3/1978 | Fed. Rep. of Germany |
| 2802709 | 7/1979 | Fed. Rep. of Germany |
| 3022924 | 1/1981 | Fed. Rep. of Germany |
| 2511668 | 2/1983 | France |
| 517116 | 5/1984 | Spain |
| 724683 | 2/1955 | United Kingdom |
| 772775 | 4/1957 | United Kingdom |
| 931609 | 7/1963 | United Kingdom |
| 1145386 | 3/1969 | United Kingdom |
| 1214530 | 12/1970 | United Kingdom |
| 1216781 | 12/1970 | United Kingdom |
| 1255964 | 12/1971 | United Kingdom |
| 1414964 | 11/1975 | United Kingdom |
| 1440403 | 6/1976 | United Kingdom |
| 1544586 | 4/1979 | United Kingdom |
| 2054548A | 2/1981 | United Kingdom |
| 2105319A | 3/1983 | United Kingdom |
| 2109363A | 6/1983 | United Kingdom |
| 2110659 | 6/1983 | United Kingdom |

OTHER PUBLICATIONS

C. M. Loucks, E. B. Morris, and E. A. Pirsh, *Organic Acids for Cleaning Power-Plant Equipment*, Oct. 24, 1958, Paper No. 58-A-282.

D. A. Swanson, *Chelating Agents as In-Service Cleaners-Field Results*, Proc. Int. Wat. Conf., 26, 55 (1965).

F. T. Wall and J. W. Drenan, *Gelation of Polyacrylic Acid by Divalent Cations*, Journal of Polymer Science, Vol. VII, No. 1, pp. 83–88 (1951).

Frederick T. Wall and Stanley J. Gill, *Interaction of Cupric Ions with Polyacrylic Acid*, Journal of Physical Chemistry, vol. 58, pp. 1128–1130 (1954).

Copyright Registration for BETZ Handbook of Industrial Water Conditioning, 8th Ed., Aug. 1, 1980.

*Boiler Feedwater Treatment is 100% Organic*, Mid-Nov., 1982, Chemical Processing.

D. A. Swanson, *The Use of Polymeric Materials with Phosphate and Chelation Type Boiler Water Treatment*, Presented at the 28th International Water Conference by the Engineers' Society of Western Pennsylvania, Dec. 11–13, 1967.

D. A. Swanson, ADVANCES IN BOILER WATER TREATMENT, *Industrial Water Engineering*, 4, Dec., 1967, pp. 22–25.

L. Ahrnbom, *Swedish Experiences with Organic Epitaxy Preventing Deposit Inhibitors in the Drinking Water Technology*, in 58 VGB Kraftwerkstechnik 378–81 (May 1978) (with translation).

Betz Laboratories, Inc., *Boiler Deposits: Occurrence and Control (High-Pressure Boiler Water Treatment)*, in Betz Handbook of Industrial Water Conditioning, chapter 11, pp. 85–96 (8th edition 1980).

J. Blay and J. Ryland, *Determination of Chelating Properties of Detergent Builders with the Calcium Selective Ion Electrode*, in 4 Analytical Letters No. 10, pp. 653–663 (1971).

D. Chang, *The Binding of Free Calcium Ions in Aqueous Solution Using Chelating Agents, Phosphates and Poly (Acrylic Acid)*, in 60 JAOCS No. 3, at 618–622 (Mar. 1983).

J. Cowan and D. Weintritt, *Water-Formed Scale Deposits*, pp. 285–293 (1976).

A. Craggs, G. Moody, and J. Thomas, *Calcium Ion-Selective Electrodes Measurements in the Presence of Complexing Ligands*, in 104 Analyst 961–72 (Oct. 1979).

D. Cuisia, D. Carter and C. Hwa, *Boiler Scale Inhibitors-Key to Fuel Savings*, in Corrosion/79 (1979).

W. Denman, M. Edelson and M. Salutsky, *Boiler Scale Control in the Carbonate Cycle with Synthetic Polymers*, in 29 International Water Conference 119 (1968).

W. Denman and M. Salutsky, *Boiler Scale Control with Polyacrylates and Polymethacrylates*, in 28 International Water Conference 85–93 (1967).

B. Edwards, *Role of Polymeric Flocculants in Sediment Removal in Condenser Cooling Systems*, in 19 J. Applied Chem. 141–6 (1969).

I. Eldib, *Polyelectrolytes-Challengers to Polyphosphates in the Detergent Revolution*, pp. 10–20 (1967).

M. Finan and A. Harris, *The Effect of Plant Operating Conditions on Recirculating Brine pH and the Effect of Brine pH on the Activity of Scale Control Additives*, in 2 Sixth Intern. Symposium on Fresh Water from the Sea 165–74 (1978).

R. Gustafson and J. Lirio, *Binding of Divalent Metal Ions by Cross-Linked Polyacrylic Acid*, in 72 the journal of Physical Chemistry 1502–05 (May 1968).

(List continued on next page.)

OTHER PUBLICATIONS

T. Hodgson and S. Smith, *The Appraisal of Additives for Scale Inhibition During Seawater Distillation*, in 1 Fifth Intern. Symposium on Fresh Water from the Sea 305–18 (1976).

J. Kelly, P. Colombo and G. Flasch, *The Investigation of Scaling and Corrosion Mechanisms Using Process Simulation*, presented at the 41st Annual Meeting, International Water Conference, Paper No. IWC-80-10 (Oct. 1980).

J. Lever, A. Friedland, D. Kon, and P. Glueckstern, *Transition from pH Control to the Use of Additives for Scale Prevention at the Eilat Sea Water Desalination Plant*, in 2 Sixth Intern. Symposium on Fresh Water from the Sea 221–30(1978).

J. Metcalf and B. Moore, *Chelate Boiler Water Treatment for More Efficient Heat Transfer and Boiler Blowdown Rates*, in 58 TAPPI No. 7, pp. 108–111 (Jul. 1975).

A. Sherry and E. Gill, *Current Trends in Corrosion Control at West Thurrock Power Station*, in 1964 J. Chemistry and Industry, 102–106.

B. R. Smith, *Scale Prevention by Addition of Polyelectrolytes*, in 3 Second European Symposium on Fresh Water from the Sea (Preprints of Papers) 44-1–44-7 (May 1967).

A. Stafford, *Polymers for the Industrial Water User*, in 4 Br. Polym. J. 231–237 (May 1972).

E. Streatfield, *Scientific Basis of Organic Boiler Water Treatment*, in 2 Effluent Water Treatment Jo. 449–55 (1962).

F. Sweett, B. R. Smith, P. Casamento and R. Taylor, *Scale Control by Polyacrylates: The effect of Molecular Weight in Traces of Metals*, in 8 Desalination 167–175 (1970).

E. Thurston, *Experimental Plant for Studying Methods of Controlling Scale Formation in Boilers*, 1965 J. Chemistry and Industry 1238–43.

C. Travers and J. Marinsky, *The Complexing of Ca(II), Co(II), and Zn(II) by Polymethacrylic and Polyacrylic Acid*, in 47 J. Polymer Sci. 285–97 (1974).

J. Walker and J. Stephens, *An Experimental Study of the Competition Between NTA and Precipitating Anions for Calcium and Magnesium*, in 35 Proceedings of the American Power Conference 923–31 (1973).

F. Williams and R. Ruehrwein, *Effect of Polyelectrolytes on the Precipitation of Calcium Carbonate*, in 79 Jo. Amer. Chem. Soc. 4898–4900 (1957).

N. Woodberry, *A New Anionic Polyacrylamide Flocculant*, in 44 TAPPI No. 9, 156A–160A (1961).

R. Zeleny and K. Vithani, *The Role of Organic Additives in Preventing Scale Formation on Heating Surfaces*, in 34 Combustion No. 8, 47–49 (1963).

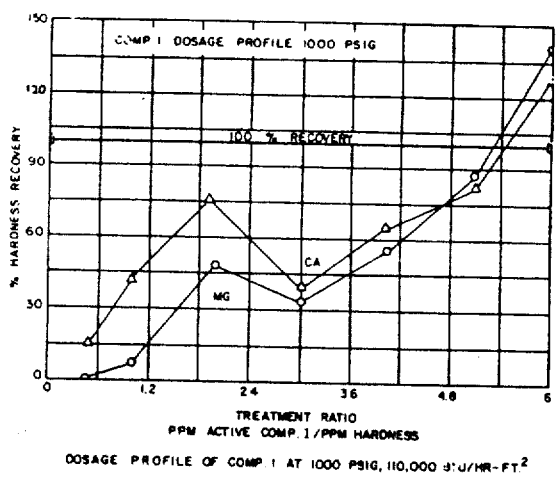

DOSAGE PROFILE OF COMP. 1 AT 1000 PSIG, 110,000 BTU/HR-FT$^2$

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 5, 6, and 13 are determined to be patentable as amended.

Claims 2, 4, 7–12 and 14, dependent on an amended claim, are determined to be patentable.

1. A method of treating hardness *including calcium and magnesium* present in boiler waters which are in contact with heat transfer surfaces *exposed to boiler operating conditions* to prevent formation of scale *including calcium and magnesium* on, and to remove previously formed scale from, these heat transfer surfaces, which comprises treating the boiler waters with *a non-corrosive treatment composition substantially free of potentially corrosive chelants, and containing* a water-soluble sequestrant anionic vinyl polymer containing at least 30% by weight of carboxylate functionality, *said polymer being chosen from the group consisting of:*
   (a) *homopolymers of the group consisting of acrylic acid, methacrylic acid, maleic acid, and fumaric acid;*
   (b) *copolymers of one member of the group consisting of acrylic acid, methacrylic acid, maleic acid, and fumaric acid with at least one other member of the group consisting of acrylic acid, methacrylic acid, maleic acid, and fumaric acid;*
   (c) *copolymers of at least one member of the group consisting of acrylic acid, methacrylic acid, maleic acid and fumaric acid with acrylamide;*
   (d) *copolymers of at least one member of the group consisting of acrylic acid, methacrylic acid, maleic acid and fumaric acid with vinyl sulfonate; and*
   (e) *hydrolyzed polyacrylamide;*
said polymer *further* having a molecular weight within the range of 500–50,000 and a chelation value of at least 200, which chelation value represents the milligrams of calcium or magnesium expressed in terms of calcium carbonate complexed by one gram of a sequestrant, and with the amount of said sequestrant anionic vinyl polymer *being based upon the amount of hardness present, and* being within the range of [1–30] *3–30* ppm *of polymer* per ppm *of* harness present in such boiler waters, whereby the hardness in the boiler waters is sequestered by the water-soluble sequestrant anionic vinyl polymer, thereby preventing formation of scale on, and removing previously formed scale from, the heat transfer surfaces [of boilers] *exposed to boiler waters.*

3. The method of claim [1] *2*, wherein the boiler water which contains hardness is treated with from 3–15 ppm of the water-soluble sequestrant anionic vinyl polymer per ppm of hardness present in said boiler water.

5. The method of claim 1 wherein the water-soluble sequestrant anionic vinyl polymer is chosen from the group consisting of:
   (a) homopolymers *of the group consisting of* acrylic acid, methacrylic acid, maleic acid, *and* fumaric acid [, and itaconic acid, and];
   (b) copolymers of [the monomers of group (a) above] *at least one member of the group consisting of acrylic acid, methacrylic acid, maleic acid and fumaric acid* with acrylamide [, and vinyl sulfonate, and];
   (c) *copolymers of at least one member of the group consisting of acrylic acid, methacrylic acid, maleic acid and fumaric acid with vinyl sulfonate; and*
   [(c)] *(d)* hydrolyzed polyacrylamide.

6. The method of claim 1 wherein the boiler water which contains hardness is simultaneously treated with a second water-soluble anionic vinyl polymeric dispersant which [includes the water soluble sequestrant which is used in excess to provide both sequestration and dispersancy] *is capable of dispersing suspended matter in said boiler water*, and the weight ratio of water soluble sequestrant anionic vinyl polymer to the second water-soluble anionic vinyl polymeric dispersant is within the range of 30:1 to 1:30.

13. The method of claim 6 wherein the second water-soluble anionic vinyl polymeric dispersant [is present at a weight ratio between 30:1 to 1:30 based on the water-soluble sequestrant anionic vinyl polymer] *includes the water soluble sequestrant which is used in excess to provide both sequestration and dispersancy.*

* * * * *

REEXAMINATION CERTIFICATE (3085th)
United States Patent [19]
Lorenc et al.

[11] B2 4,457,847
[45] Certificate Issued Dec. 31, 1996

[54] CARBOXYLATE POLYMERS FOR INTERNAL SCALE CONTROL AGENTS IN BOILER SYSTEMS

[75] Inventors: Walter F. Lorenc, Harvey; John G. Kelly, Woodridge, both of Ill.; Frederick S. Mandel, Baton Rouge, La.

[73] Assignee: Nalco Chemical Company

Reexamination Requests:
No. 90/001,942, Feb. 20, 1990
No. 90/003,157, Aug. 3, 1993

Reexamination Certificate for:
Patent No.: 4,457,847
Issued: Jul. 3, 1984
Appl. No.: 382,567
Filed: May 28, 1982

Reexamination Certificate B1 4,457,847 issued Dec. 8, 1987

Certificate of Correction issued Oct. 29, 1985.

Related U.S. Application Data

[63] Continuation-in-part of Ser. No. 318,665, Nov. 5, 1981, abandoned.

[51] Int. Cl.$^6$ .......................................................... C02F 5/10
[52] U.S. Cl. ...................... 210/698; 134/22.19; 210/701; 252/82; 252/180

[56] References Cited

U.S. PATENT DOCUMENTS

| | | | |
|---|---|---|---|
| 2,327,302 | 8/1943 | Dittmar | 252/132 |
| 2,723,956 | 11/1955 | Johnson | 210/23 |
| 2,729,557 | 1/1956 | Booth et al. | 74/105 |
| 2,783,200 | 2/1957 | Crum et al. | 210/23 |
| 2,947,036 | 8/1960 | Anspon | 18/48 |
| 2,980,610 | 4/1961 | Ruehrwein | 210/58 |
| 3,085,916 | 4/1963 | Zimmie et al. | 134/22 |

(List continued on next page.)

FOREIGN PATENT DOCUMENTS

| | | |
|---|---|---|
| 490312 | 1/1977 | Australia . |
| 614685 | 2/1961 | Canada . |
| 1057943 | 7/1979 | Canada . |

(List continued on next page.)

OTHER PUBLICATIONS

Gilbert, "Non-Aggressive Cleaning Procedures," 26th International Water Conference, 1965, pp. 81-82 (Tab C).

Young, "Polyectrolyte for Boiler Sludge Conditioning," 1966 Reports Hawaiian Sugar Technologists 25th Annual Conference, 1967, pp. 16-18 (Tab D).

S. Boyette et al., Ultrasperse™: A New All-Polymer Treatment Program, 55th Annual International Water Conference, Pittsburgh, Pennsylvania (Oct. 31-Nov. 2, 1994).

D. M. Chang, *J. Amer. Oil Chemists Soc.*, 60(3), 618 (1983).

J. A. Kelly et al., Improved Control of Boiler Scaling and Corrosion with an All-Polymer Internal Treatment Program, 44th Annual International Water Conference, Pittsburgh, Pennsylvania (Oct. 24-26, 1983).

R. L. Worthington et al., *Power Engineering*, Nov., 55 (1983).

(List continued on next page.)

*Primary Examiner*—Peter A. Hruskoci

[57] ABSTRACT

A method of treating hardness present in boiler waters which are in contact with heat transfer surfaces to prevent and remove scale caused by such hardness which comprises treating such waters with a water-soluble anionic vinyl polymer containing at least 30% by weight of carboxylate functionality with said polymer having a molecular weight within the range of 500–50,000 and with the amount of such polymer being within the range of 1–30 ppm per ppm hardness present in such waters.

In a preferred embodiment, the boiler waters are simultaneously treated with the water-soluble anionic vinyl polymers containing carboxylate functionality and another water-soluble anionic vinyl polymer which has dispersing properties.

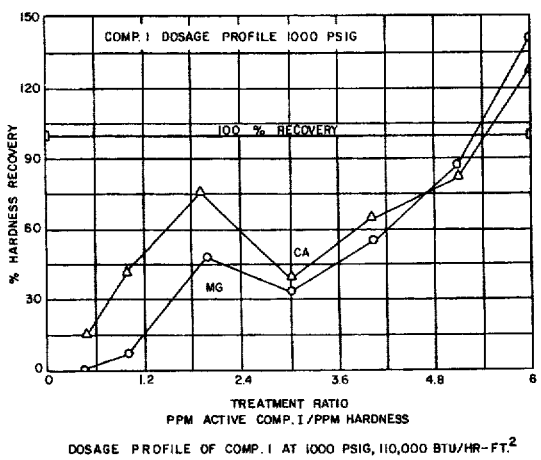

DOSAGE PROFILE OF COMP. I AT 1000 PSIG, 110,000 BTU/HR-FT.$^2$

U.S. PATENT DOCUMENTS

| Number | Date | Name | Class |
|---|---|---|---|
| 3,285,886 | 11/1966 | Gunderson et al. | 260/80.3 |
| 3,293,152 | 12/1966 | Herbert et al. | 203/7 |
| 3,296,027 | 1/1967 | Jacklin | 134/3 |
| 3,324,063 | 6/1967 | Teot | 260/29.6 |
| 3,331,773 | 7/1967 | Gunderson et al. | 210/58 |
| 3,405,060 | 10/1968 | Carter et al. | 210/58 |
| 3,463,730 | 8/1969 | Booth et al. | 210/58 |
| 3,483,033 | 12/1969 | Casey | 127/61 |
| 3,492,240 | 1/1970 | Hettinger, Jr. | 252/180 |
| 3,505,238 | 4/1970 | Liddell | 252/180 |
| 3,514,376 | 5/1970 | Salutsky | 203/7 |
| 3,515,575 | 6/1970 | Arnold | 117/102 |
| 3,549,538 | 12/1970 | Jacklin | 252/82 |
| 3,549,548 | 12/1970 | Newman | 252/181 |
| 3,578,589 | 5/1971 | Hwa et al. | 210/58 |
| 3,579,455 | 5/1971 | Sabatelli et al. | 252/135 |
| 3,617,577 | 11/1971 | King | 210/58 |
| 3,623,991 | 11/1971 | Sabatelli et al. | 252/180 |
| 3,630,937 | 12/1971 | Baum et al. | 252/181 |
| 3,649,547 | 3/1972 | Lummus | 252/181 |
| 3,650,970 | 3/1972 | Pratt | 252/181 |
| 3,658,710 | 4/1972 | Puckorius et al. | 252/87 |
| 3,663,448 | 5/1972 | Ralston | 252/180 |
| 3,666,664 | 5/1972 | Lorenc et al. | 210/58 |
| 3,682,224 | 8/1972 | Bleyle | 159/47 |
| 3,689,436 | 9/1972 | Stamm | 252/545 |
| 3,692,704 | 9/1972 | Stamm et al. | 252/525 |
| 3,699,048 | 10/1972 | Krueger et al. | 252/180 |
| 3,709,815 | 1/1973 | Boothe et al. | 210/58 |
| 3,709,816 | 1/1973 | Walker et al. | 210/58 |
| 3,715,307 | 2/1973 | Johnson et al. | 210/58 |
| 3,752,761 | 8/1973 | Boothe et al. | 210/58 |
| 3,755,264 | 8/1973 | Testa | 260/78.5 R |
| 3,756,257 | 7/1973 | Rice et al. | 134/3 |
| 3,766,077 | 10/1973 | Hwa et al. | 252/180 |
| 3,790,610 | 2/1974 | Lum et al. | 260/429 J |
| 3,791,978 | 2/1974 | Krueger et al. | 252/180 |
| 3,806,367 | 4/1974 | Lange et al. | 134/3 |
| 3,810,834 | 5/1974 | Jones et al. | 210/58 |
| 3,836,200 | 9/1974 | Booth | 302/66 |
| 3,837,803 | 9/1974 | Carter et al. | 21/2.7 |
| 3,839,215 | 10/1974 | Mulders | 252/181 |
| 3,856,755 | 12/1974 | Vogt et al. | 260/78.5 T |
| 3,879,288 | 4/1975 | Siegele | 210/58 |
| 3,890,228 | 6/1975 | Hwa et al. | 210/58 |
| 3,898,037 | 8/1975 | Lange et al. | 21/2.7 R |
| 3,904,522 | 9/1975 | Greenfield | 210/58 |
| 3,904,635 | 9/1975 | Senoo et al. | 260/293.86 |
| 3,904,685 | 9/1975 | Shahidi et al. | 260/537 N |
| 3,928,196 | 12/1975 | Persinski et al. | 210/58 |
| 3,933,673 | 1/1976 | Davies | 252/135 |
| 3,941,562 | 3/1976 | Hollingshad | 21/2.7 R |
| 3,948,792 | 4/1976 | Watsen et al. | 252/181 |
| 3,950,260 | 4/1976 | Eldib | 252/89 |
| 3,959,167 | 5/1976 | Hwa et al. | 252/180 |
| 3,965,027 | 6/1976 | Boffardi et al. | 252/180 |
| 3,965,028 | 6/1976 | O'Brien et al. | 252/180 |
| 3,989,636 | 11/1976 | Domba | 252/180 |
| 3,992,318 | 11/1976 | Gaupp et al. | 252/389 A |
| 4,001,134 | 1/1977 | Markofsky et al. | 252/180 |
| 4,001,161 | 1/1977 | Song et al. | 260/29.6 H |
| 4,004,939 | 1/1977 | O'Brien et al. | 106/135 |
| 4,008,164 | 2/1977 | Watson et al. | 252/8.55 B |
| 4,018,702 | 4/1977 | Boffardi et al. | 252/389 R |
| 4,029,577 | 6/1977 | Godlewski et al. | 210/58 |
| 4,048,066 | 9/1977 | Cuisia et al. | 210/58 |
| 4,065,607 | 12/1977 | Kurowsky | 526/15 |
| 4,072,607 | 2/1978 | Schiller et al. | 210/58 |
| 4,085,045 | 4/1978 | Song et al. | 210/58 |
| 4,085,060 | 4/1978 | Vassileff | 252/180 |
| 4,118,318 | 10/1978 | Welder et al. | 210/58 |
| 4,126,549 | 11/1978 | Jones et al. | 210/58 |
| 4,147,627 | 4/1979 | Goodman | 210/58 |
| 4,163,733 | 8/1979 | Buckman et al. | 253/180 |
| 4,171,988 | 10/1979 | Phillips et al. | 134/22 R |
| 4,175,100 | 11/1979 | Schiller et al. | 525/327 |
| 4,186,027 | 1/1980 | Bell et al. | 106/288 |
| 4,209,398 | 6/1980 | Ii et al. | 210/58 |
| 4,255,309 | 3/1981 | Klaessig et al. | 260/29.6 WB |
| 4,267,059 | 5/1981 | Behn et al. | 210/736 |
| 4,271,058 | 6/1981 | Trabitzsch et al. | 260/296.6 M |
| 4,279,768 | 7/1981 | Busch | 252/180 |
| 4,288,327 | 9/1981 | Godlewski et al. | 210/698 |
| 4,301,266 | 11/1981 | Muenster et al. | 526/212 |
| 4,303,568 | 12/1981 | May et al. | 260/29.6 MP |
| 4,314,004 | 2/1982 | Stoneberg | 428/421 |
| 4,326,980 | 4/1982 | Snyder et al. | 252/180 |
| 4,335,220 | 6/1982 | Coney | 523/414 |
| 4,342,652 | 8/1982 | Schiller et al. | 210/698 |
| 4,361,492 | 11/1982 | Dubin | 252/175 |
| 4,374,733 | 2/1983 | Snyder et al. | 210/701 |
| 4,384,979 | 5/1983 | Hansen | 252/389 A |
| 4,545,920 | 10/1985 | Lorenc et al. | 252/180 |
| 4,566,972 | 1/1986 | Bennison et al. | 210/698 |
| 5,126,108 | 6/1992 | Leighton et al. | 422/15 |
| 5,254,286 | 10/1993 | Gill et al. | 252/180 |
| 5,350,536 | 9/1994 | Chen et al. | 252/180 |

FOREIGN PATENT DOCUMENTS

| Number | Date | Country |
|---|---|---|
| 1097555 | 3/1981 | Canada . |
| 00320410 | 7/1981 | European Pat. Off. . |
| 2511668 | 2/1983 | France . |
| 1134786 | 8/1962 | Germany . |
| 2344498 | 3/1974 | Germany . |
| 2405192 | 8/1974 | Germany . |
| 2434816 | 5/1976 | Germany . |
| 2643422 | 3/1978 | Germany . |
| 2802709 | 7/1979 | Germany . |
| 2910133 | 9/1980 | Germany . |
| 3022924 | 1/1981 | Germany . |
| 30-9501 | 12/1955 | Japan . |
| 47-11357 | 6/1972 | Japan . |
| 49-30914 | 8/1974 | Japan . |
| 50-26764 | 3/1975 | Japan . |
| 53-60835 | 5/1978 | Japan . |
| 53-86653 | 7/1978 | Japan . |
| 54-148147 | 11/1979 | Japan . |
| 56-20169 | 2/1981 | Japan . |
| 56-23283 | 3/1981 | Japan . |
| 561337 | 10/1944 | United Kingdom . |
| 724683 | 2/1955 | United Kingdom . |
| 772775 | 4/1957 | United Kingdom . |
| 931609 | 7/1963 | United Kingdom . |
| 1145386 | 3/1969 | United Kingdom . |
| 1203449 | 8/1970 | United Kingdom . |
| 56760/70 | 11/1970 | United Kingdom . |
| 1214530 | 12/1970 | United Kingdom . |
| 1216781 | 12/1970 | United Kingdom . |
| 1255964 | 12/1971 | United Kingdom . |
| 1414964 | 11/1975 | United Kingdom . |
| 1433221 | 4/1976 | United Kingdom . |
| 1440403 | 6/1976 | United Kingdom . |
| 1539974 | 2/1979 | United Kingdom . |
| 1544586 | 4/1979 | United Kingdom . |
| 2023121 | 12/1979 | United Kingdom . |
| 2054548 | 2/1981 | United Kingdom . |
| 2105319 | 3/1983 | United Kingdom . |
| 2109363 | 6/1983 | United Kingdom . |
| 2110659 | 6/1983 | United Kingdom . |

OTHER PUBLICATIONS

Ahrnbom, L., "Swedish Experiences with Organic Epitaxy Preventing Deposit Inhibitors in the Drinking Water Technology," in 58 *VGB Kraftwekstechnik* 378-81 (May 1978) (with translation).

Air Products, Sodium Vinyl Sulfonate Technical Bulletin (1980).

American Cyanamid Company FDA Food Additive Petition No. 8A 222 7 dated Mar. 5, 1968.

Aquaness Chemical Company, Calnox 214 DN Product Bulletin (1971).

Baggley, Glenn W. and Broz, Ivan J., "Effect of Drum Internal Design and Water Treatment on Corrosion, Circulation and Steam Purity," 38th Int'l. Water Conference (1977).

Barber, D. and Dundar, Y., "Early Experience with Water Chemistry at the 250 MW(e) Gentilly Nuclear Power Station," 33rd Int'l. Water Conference (1972).

Bell, William E., "Chemical Cleaning with Citric-Acid Solutions," Paper No. 60-WA-257, The American Society of Mechanical Engineers (1960).

Bell, W. E., Rice, R. C. and Clark, R. J., "Chelating Agents in the Treatment of Boiler Feedwater," 30th Int'l. Water Conference (1969).

Blay J., and Ryland, J., "Determination of Chelating Properties of Detergent Builders With the Calcium Selective Ion Electrode," in 4 *Anal. Lett.*, No. 10, pp. 653-663 (1971).

"Boiler Deposits: Occurrence and Control (High-Pressure Boiler Water Terminal)," *BETZ Handbook of Industrial Water Conditioning*, Chap. 12, pp. 94-104 (7th Ed. 1976).

"Boiler Deposits: Occurrence and Control (High-Pressure Boiler Water Terminal)," *BETZ Handbook of Industrial Water Conditioning*, Chap. 11, pp. 85-96 (8th Ed. 1980).

"Boiler Feedwater Treatment is 100% Organic," Mid-Nov., 1982 *Chemical Processing*.

Bradley, G. W., Martin, L. D., Banks, W. P. and Forst, J. G., "Investigation of Ammonium Citrate Cleaning Solvents," Nov. 4-6, 1975, Paper No. IWC No. 75-18, Int'l. Water Conference.

Chagnard, H. A., Tvedt, T. J. and Shearer, B. L., "An In-Depth Field Evaluation of Iron Transport in 1400 PSI Boilers With Various Water Treatments," 41st Int'l. Water Conference (1980).

Chang, D. M., "The Binding of Free Calcium Ions in Aqueous Solution Using Chelating Agents, Phosphates and Poly (Acrylic Acid)," 60 JAOCS No. 3, at 618-622 (Mar. 1983).

Christian, Robert A., "Use of Vertan 600 at 900 to 1900 psig," 26th Int'l. Water Conference (1965).

Ciba Geigy Case History, "High Pressure Boiler Plant", 1978.

Ciba-Geigy, Belclene 200 Liquid Scale Inhibitor, Product Bulletin (1977).

Coughanour, Robert B., "Chelating Agents for Boiler Treatment," 26th Int'l. Water Conference (1965).

Cowan, J. and Weintritt, D., *Water-Formed Scale Deposits;* pp. 285-293 (1976).

Craggs, A., Moody, G. and Thomas, J., "Calcium Ion-Selective Electrode Measurements in the Presence of Complexing Ligands," in 104 *Analyst* 961-72 (Oct. 1979).

Cuisia, Dionisio G., "New Trends in Boiler Scale Control," 34th Int'l. Water Conference (1973).

Cuisia, Dionisio G., "The Use of Sulfonated Styrene Copolymers for Boiler Scale Control," 39th Int'l. Water Conference (1978).

Cuisia, D., Carter, D. and Hwa, C., "Boiler Scale Inhibitors—Key to Fuel Savings," in *Corrosion/79* (1979).

Dearborn Chemical Company FDA Food Additive Petition No. 5A 1535 dated Jun. 19, 1965.

Dearborn Technical Bulletins 4260 and 4261 (undated).

Denman, W., Edelson, M. and Salutsky, M., "Boiler Scale Control with Polyacrylates and Polymethacrylates," in 28 Int'l. Water Conference 85-93 (1967).

Denman, W., Edelson, M. and Salutsky, M., "Boiler Scale Control in the Carbonate Cycle with Synthetic Polymers," in 29 Int'l. Water Conference 119-123 (1968).

Duff, Joseph H., "Makeup and Feedwater Treatment for Large Utility Boilers," 39th Int'l. Water Conference (1978).

Edwards, B., "Role of Polymeric Flocculants in Sediment Removal in Condenser Cooling Systems," in 19 *J. Applied Chem.* 141-6 (1969).

Eldib, I., "Polyelectrolytes—Challengers to Polyphosphates in the Detergent Revolution," pp. 10-20 (1967).

Elliot, "Scale Control by Threshold Treatment," *Desalination* (1970).

*Encyclopedia of Polymer Science and Technology*, pp. 208-226 (1964).

Fanaritis, J. P. and Kimmel, J. D., "Review of Once-Through Steam Generators," *J. Petroleum Technology*, pp. 409-416, Apr., 1965.

"Feedwater Treatment Reduces Downtime, Improves Performance", Water Treatment, A Special Report, *Power,* Jun., 1964, pp. 28-29, 40.

Finan, M. and Harris, A., "The Effect of Plant Operating Conditions on Recirculating Brine pH and the Effect of Brine pH on the Activity of Scale Control Additives," in 2 Sixth Intern. Symposium on Fresh Water from the Sea 165-74 (1978).

Fisher, Sallie and Otten, Gerard, "What Really Happens to Organics in Water Treatment Systems," 39th Int'l. Water Conference (1978).

Fletcher, W. D., "Primary Coolant Chemistry of PWR's," 31st Int'l. Water Conference (1970).

Fletcher, W. D. and Picone, L. F., "Secondary Water Treatment of PWR Steam Generators," 33rd Int'l. Water Conference (1972).

Gabrielli, F. and Sylvester, W. R., "Water Treatment Practices for Cyclic Operation of Utility Boilers," 39th Int'l. Water Conference (1978).

Gaylor, Lawrence A. and Sprague, Sherman J., "Boiler Scale Inhibitors," 42nd Int'l. Water Conference (1981).

Gilbert, Morton, "Non-Aggressive Cleaning Procedures", 26th Int'l. Water Conference, 1965, pp. 81-82.

Good, R. Brian and Arots, Joseph B., "The Thermal Hydrolytic Stability of 1-Hydroxyethylidene-1,1-Diphosphonic Acid," 42nd Int'l. Water Conference (1981).

Greenlimb, Peter E. and Carter, D. Anthony, "The Use of Sulfonated Styrene Copolymers as Boiler Water Sludge Conditioning Agents," 41st Int'l. Water Conference (1980).

Gustafson, Richard L. and Lirio, Joseph A., "Binding of Divalent Metal Ions by Cross-Linked Polyacrylic Acid," *J. Phys. Chem.*, vol. 72, No. 5, pp. 1502-1505 (1968).

*Handbook of Service Water and Wastewater,* pp. 347-348 (1964) (in Japanese).

Helmstetter Gerald J. and Holze, Dr. Robert A., "Sulfonated Polymers and Scale Formation," 39th Int'l. Water Conference (1978).

Herman, K. W., "Internal Boiler Water Treatment," 38th Int'l. Water Conference (1977).

Hodgson, T. and Smith, S., "The Appraisal of Additives for Scale Inhibition During Seawater Distillation," in 1 Fifth Intern. Symposium on Fresh Water from the Sea 305-18 (1976).

Jacklin, Clarence and Wiltsey, Donald G., "Dissolved Hydrogen Analyzer—A Tool for Boiler Corrosion Studies," *Materials Protection and Performance*, May, 1971.

JIS B-8223, p. 3 (1977).

Kagako Kogyo Co, *Water-Soluble Polymer*, pp. 100-105 (1976) (in Japanese).

Kelly, J. A., and Palmer, M. L., "Iron Oxide Deposition—Complete System Control," 40th Int'l. Water Conference (1979).

Kelly, J. A., Colombo, P. T. and Flasch, G. W., "The Investigation of Scaling and Corrosion Mechanisms Using Process Simulation," 41st Intl.'l. Water Conference (1980).

Kelly, J. A., "The Investigation of Scaling and Corrosion Mechanisms Using Process Simulation-Part II," 42nd Int'l. Water Conference (1981).

Kemmer, Frank N., Ed., *The Nalco Water Handbook*, Chap. 12, "Ion Exchange," Chap. 39, Boiler Water Treatment, and glossary, pp. G-1 to G-9 (1979).

Kinney, Irv and Vinson, Jim, "Analytical Problems in Chemical Cleaning of Corrosion Products from Steam Boilers," 39th Int'l. Water Conference (1978).

LaLena, Peter P., "Hideout–A Measure of Boiler Cleanliness–and More," 37th Int'l. Water Conference (1976).

Lev-er, J., Friedland, A., Kon, D. and Glueckstern, P., "Transition from pH Control to the Use of Additives for Scale Prevention at the Eilat Sea Water Desalination Plant," in 2 Sixth Intern. Symposium on Fresh Water from the Sea 221-30 (1978).

Löf, George O. G. and Kneese, Allen V., "Water Utilization in the Beet Sugar Industry," 27th Int'l. Water Conference (1966).

Loucks, C. M., Morris, E. B. and Pirsh, E. A., "Organic Acids for Cleaning Power–Plant Equipment," Paper No. 58–A–282, The American Society of Mechanical Engineers (1958).

Martynova, Olga I., "Water Treatment Practice and Water Conditions of Thermal Power Plants in the USSR," 30th Int'l. Water Conference (1969).

Metcalf, J. and Moore, B., "Chelate Boiler Water Treatment for More Efficient Heat Transfer and Boiler Blowdown Rates," in 58 TAPPI No. 7, pp. 108–111 (Jul. 1975).

Metcalf, J. R., "Boiler Chelant Treatment: An Update," 31st Int'l. Water Conference (1970).

Meyer, S. Olaf, "Use of a Chelant Program for 'On Stream' Boiler Cleaning," 26th Int'l. Water Conference (1965).

Moffett, J. W. and Zoski, J. E., "Corrosion Product Sampling and Mass Balance in a High Pressure Boiler," 40th Int'l. Water Conference (1979).

NALCO Technical Bulletin, "An Introduction to Boiler Feedwater Treament", 1978.

*Principles of Industrial Water Treatment*, Drew Chemical Corporation, pp. 190-207 (1979).

Rice, James K., "An Overview of Industrial Boiler Water Technology as Related to Cogeneration," 38th Int'l. Water Conference (1977).

Riess, R., "The Experience with the Water Chemistry of Siemens PWR's," 33rd Int'l. Water Conference (1972).

Rozenberg, J., Dolle, L. and Darras, R., "Control of Corrosion Products Movement and Deposited Activities in Reactor Circuits," 37th Int'l. Water Conference (1976).

Sawochka, S. G. and Pearl, W. L., "Corrosion Product Chemistry of a Boiling Water Reactor," 31st Int'l. Water Conference (1970).

Schuck, J. J. and Godlewski, I. T., "Development of Boiler Waterside Deposit Control Agents: From Laboratory Through Industrial Application," 39th Int'l. Water Conference (1978).

Seels, F. H., Gibbon, D. L. and Simon, G. C. "Deposit Formation in a 600 psi Boiler Using Chelate Based Water Treatment," 42nd Int'l. Water Conference (1981).

Sexsmith, et al., "The Use of Polymers for Water Treatment," 30th Int'l. Water Conference (1969).

Sherry, A. and Gill, E., "Current Trends in Corrosion Control at West Thurrock Power Station," in 1964 *J. Chemistry and Industry*, 102–106.

Simon, "Feedwater Quality in Modern Industrial Boilers—A Consensus of Proper Operating Practices", 36th Int'l. Water Conference, 1975, pp. 65–68.

Slicker, J. L., "Continuous Boiler Treatment with EDTA: In–Service Cleaning," 26th Int'l. Water Conference (1965).

Slicker, Joseph L. and Sterling, J. A., "The Use of Chelants," 30th Int'l. Water Conference (1969).

Smith, B. R., "Scale Prevention by Addition of Polyelectrolytes," in 3 Second European Symposium on Fresh Water from the Sea (Preprints of Papers) 44–1–44–7 (May 1967).

Stafford, A., "Polymers for the Industrial Water User," in 4 *Br. Polym.* 231–237 (May 1972).

Stephens, James and Walker, Jerry, "Predicting Chelate Performance in Boilers," *Industrial Water Engineering* V10(4), p. 30 (1973).

Streatfield, E., "Scientific Basis of Organic Boiler Water Treatment," in 2 *Effluent Water Treatment Jo.* 449–455 (1962).

Stultz, R. Kent, Harrow, Lee G., Huang, C. K., Hutchens, D. C., Hoekfer, G. H. and Chambers, James M., "Heating Boiler Treatment Chromate vs. a Non–Hazardous Treatment," 42nd Int'l. Water Conference (1981).

Swanson, D. A., "Chelating Agents as In–Service Cleaners—Field Results," 26th Int'l. Water Conference, p. 55 (1965).

Swanson, D. A., "Advances in Boiler Water Treatment," *Industrial Water Engineering*, 4, Dec., 1967, pp. 22–25.

Swanson, D. A., "The Use of Polymeric Materials with Phosphate and Chelation Type Boiler Water Treatment," 28th Int'l. Water Conference (1967).

Sweett, F., Smith, B. R., Casamento, P, and Taylor, R., "Scale Control by Polyacrylates: The Effect of Molecular Weight in Traces of Metals," in 8 *Desalination* 167–175 (1970).

Tarbay, P. C. and Rivers, H. W., "Complete Automation of Boiler Plant Chemical Control," 32nd Int'l. Water Conference (1971).

Thurston, E., "Experimental Plant for Studying Methods of Controlling Scale Formation in Boilers," 1965 *J. Chemistry and Industry* 1238–243.

Toomey, A. E., "Utility Boiler Feedwater Treatment at CIPSCO," 38th Int'l. Water Conference (1977).

Travers, C. and Marinsky, J., "The Complexing of Ca(II), Co(II), and Zn(II) by Polymethacrylic and Polyacrylic Acid," in 47 *J. Polymer Sci.* 285–297 (1974).

Venezky, D. L. and Dausel, Jr., R. L., "EDTA As A Boiler Water Treatment Program at 1200 PSIG," 40th Int'l. Water Conference (1979).

Von Peter Berth, G. Jakobi und Schmadel, E., "Phosphate and Phosphatsubstitute für Waschmittel," Chemiker–Zeitung, vol. 95, No. 12, pp. 548–553 (1971).

W. R. Grace & Company, FDA Petition No. 9A 2365 dated Jun. 4, 1969.

Walker, J. L. and Stephens, J. R., "A Comparative Study of Chelating Agents Their Ability to Prevent Deposits in Industrial Boilers," 34th Int'l. Water Conference, pp. 83–97 (1973).

Walker, J. and Stephens, J., "An Experimental Study of the Competition Between NTA and Precipitating Anions for Calcium and Magnesium," in 35 Proceedings of the American Power Conference 923–931 (1973).

Walker, J. L., et al., "An Overview of Internal Boiler Water Treatment with Emphasis on Control of Magnesium Deposits," (1979).

Wall, F. T. and Drenan, J. W., "Gelation of Polyacrylic Acid by Divalent Cations," *J. Polymer Sci.*, voll VII, No. 1, pp. 83–88 (1951).

Wall, Frederick T. and Gill, Stanley J., "Interaction of Cupric Ions With Polyacrylic Acid," *J. Phys. Chem.*, vol. 58, pp. 1128–1130 (1954).

Weick, R. H., "How to Determine When an Industrial Boiler Needs Cleaning," 36th Int'l. Water Conference (1975).

Williams, F. and Ruehrwein, R., "Effect of Polyelectrolytes on the Precipitation of Calcium Carbonate," in 79 *Jo. Amer. Chem. Soc.* 4898–4900 (1957).

Woodberry, N., "A New Anionic Polyacrylamide Flocculant," in 44 TAPPI No. 9, 156A–160A (1961).

Young, Peter L., "Polyelectrolyte for Boiler Sludge Conditioning", 1966 Reports Hawaiian Sugar Technologies 25th Annual Conference, 1967.

Zeleny, R. and Vithani, K., "The Role of Organic Additives in Preventing Scale Formation on Heating Surfaces," in 34 *Combustion* No. 8, 47–49 (1963).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *